US012769540B2

(12) United States Patent
Taleb Hashemi

(10) Patent No.: US 12,769,540 B2
(45) Date of Patent: Oct. 20, 2026

(54) TARGETING CODE ANALYSIS ON UNPREDICTABLE SECTIONS OF TEXT

(71) Applicant: Oracle International Corporation, Redwood Shores, CA (US)

(72) Inventor: Kamran Taleb Hashemi, San Antonio, TX (US)

(73) Assignee: Oracle International Corporation, Redwood Shores (CA)

( * ) Notice: Subject to any disclaimer, the term of this patent is extended or adjusted under 35 U.S.C. 154(b) by 263 days.

(21) Appl. No.: 18/595,039

(22) Filed: Mar. 4, 2024

(65) Prior Publication Data

US 2025/0278264 A1 Sep. 4, 2025

(51) Int. Cl.

*G06F 8/70* (2018.01)
*G06F 21/57* (2013.01)
*G06F 40/20* (2020.01)
*G06F 40/242* (2020.01)

(52) U.S. Cl.

CPC .............. *G06F 8/70* (2013.01); *G06F 21/577* (2013.01); *G06F 40/20* (2020.01); *G06F 40/242* (2020.01)

(58) Field of Classification Search

CPC .......... G06F 8/70; G06F 40/242; G06F 21/50; G06F 21/577; G06F 2221/033

See application file for complete search history.

(56) References Cited

U.S. PATENT DOCUMENTS 9,336,381 B1 * 5/2016 Kane-Parry ............. G06F 21/50
11,550,569 B2 * 1/2023 Makmel ................ G06F 21/577
11,847,244 B1 * 12/2023 Madan .................. G06N 3/045
12,511,375 B2 * 12/2025 Duggan ................ G06F 21/552

(Continued)

FOREIGN PATENT DOCUMENTS

WO WO-2021085983 A1 * 5/2021 ........... G06F 21/577

OTHER PUBLICATIONS

Chandwani, Akash, What is Gitleaks and how to use it?, Medium, 2022, 17 pages, [retrieved on Jan. 12, 2026], Retrieved from the Internet: <URL:https://akashchandwani.medium.com/what-is-gitleaks-and-how-to-use-it-a05f2fb5b034>.*

(Continued)

*Primary Examiner* — Geoffrey R St Leger
(74) *Attorney, Agent, or Firm* — Mughal Gaudry & Franklin PC

(57) ABSTRACT

Code and text processing and analysis tools are provided for finding potentially sensitive information in a corpus of code. A request is received to analyze a corpus of code or text to find potentially sensitive information. Information unlikely to be sensitive is removed from the corpus of code or text to generate a modified copy of the corpus of code or text. Frequently occurring sections may also be removed as unlikely to be sensitive. An unpredictability score is determined for the remaining sections of the modified copy of the corpus of code or text, and the unpredictability score is used to prioritize unpredictable sections for review. Selectable section identifiers of the prioritized sections may be sorted in a code or text navigation interface and reviewed in a code or text viewing interface to determine whether the selected sections incorrectly contain sensitive information. If so, corrective actions may be triggered.

20 Claims, 11 Drawing Sheets

(56) References Cited

U.S. PATENT DOCUMENTS

| | | | | |
|---|---|---|---|---|
| 2020/0401702 | A1* | 12/2020 | Karabatis .................. | G06F 8/75 |
| 2023/0070420 | A1* | 3/2023 | Moran .................... | G06F 8/427 |

OTHER PUBLICATIONS

Basak, Setu Kumar, et al., A Comparative Study of Software Secrets Reporting by Secret Detection Tools, 2023 ACM/IEEE International Symposium on Empirical Software Engineering and Measurement (ESEM), Oct. 2023, 12 pages, [retrieved on Jan. 13, 2026], Retrieved from the Internet: <URL:http://ieeexplore.ieee.org/>.*

* cited by examiner

TARGETING CODE ANALYSIS ON UNPREDICTABLE SECTIONS OF TEXT

BACKGROUND

Companies will go to great lengths to ensure their software and data is secure. Data breaches and cyberattacks occur thousands of times per day and often multiple times per minute. Data breaches and cyberattacks often cost companies millions of dollars. Dealing with data breaches and cyberattacks after-the-fact requires triaging to confirm what breach happened, mitigate further loss, identify any sensitive data that was stolen, re-secure logins, passwords, certificates, tokens, and other authentication pathways, contact impacted parties, and file mandatory reports.

For software companies, software and data security are even more important. Compromised software released by one company could impact potentially hundreds or thousands of companies and potentially millions or billions of customers, depending on the reach of the software across the industry. For this reason, software companies must be even more careful that their products and services are not exposing their customers.

In some scenarios, customers of software companies can cause data breaches that impact other customers. If the software company allows the customer to use or modify certain computing resources, without the proper security review and boundaries in place, the customer may create back door pathways into those computing resources that impact the service provider more generally.

For at least these reasons, companies should be cautious of the code bases they use to host their data. In particular, software companies should carefully consider and analyze any code that they allow to be part of their code base, as compromised code can cause data breaches not just for their own company but also for other companies. As software companies collaborate to accomplish greater goals, not all companies will be applying the same level of caution with respect to their expansive code bases.

Many large-scale software projects are developed over several years, with hundreds or even thousands of contributors contributing to potentially millions or even billions of lines of code across thousands or even millions of source files. Such large-scale software projects bring huge benefits to their implementers, who may be from different companies. For example, the software projects may provide interfaces to use new technologies, and often provide new security safeguards that account for known security vulnerabilities of the past. These improvements are part of the constant march of software progress. However, large-scale software projects with millions of lines of code cannot practically be analyzed for every possible security issue. Such projects may already be compromised without the knowledge of the implementers, awaiting the next significant data breach. Currently, implementers of large-scale software projects manually review as much of the code as possible, at great time and expense, but may still miss the compromised code that eventually causes a data breach. By the time the code is finally reviewed, the code may have already changed significantly, leaving the involved companies always guessing whether there are any security issues in the code.

BRIEF SUMMARY

Code and text processing and analysis tools are provided for finding potentially sensitive information in a corpus of code. A request is received to analyze a corpus of code or text to find potentially sensitive information. Information unlikely to be sensitive is removed from the corpus of code or text to generate a modified copy of the corpus of code or text. Frequently occurring sections may also be removed as unlikely to be sensitive. An unpredictability score is determined for the remaining sections of the modified copy of the corpus of code or text, and the unpredictability score is used to prioritize unpredictable sections for review. Selectable section identifiers of the prioritized sections may be sorted in a code or text navigation interface and reviewed in a code or text viewing interface to determine whether the selected sections incorrectly contain sensitive information. If so, corrective actions may be triggered.

The tools may be implemented on one or more computer systems or in a cloud service environment hosted by one or more computer systems. The tools may be stored on a non-transitory computer-readable medium that can be read and processed by different computer systems. A computer system may include a combination of specially configured hardware and software to perform the steps described herein. The techniques described herein may be implemented as machine-performed steps for finding potentially sensitive information in a corpus of code, which help to reduce or focus any subsequent manual analysis of the code.

In some embodiments, a computer-implemented method includes storing a corpus of code that includes lines of code extracted from data structure(s) of a code project. The method further includes storing a text patterns that are predetermined to be irrelevant to a further code analysis when occurring in code projects. The method involves detecting and removing occurrences of text patterns of the stored text patterns from the corpus of code, which may be a copy or other derivative of code from the code project. The detecting and removing generate a modified corpus of code that omits the occurrences of the text patterns of the stored text patterns.

In various embodiments using various techniques described herein, for each section of a plurality of sections of code in the modified corpus of code, the method further determines an information unpredictability score of the section. The information unpredictability score is based on an unpredictability of text in the section. For example, a first section of the sections of code may have a first information unpredictability score and a second section of the sections of code may have a second information unpredictability score that indicates the second section is more unpredictable than the first section. Based on the first information unpredictability score and the second information unpredictability score, in one embodiment, the method further determines that the first section is predictable and the second section is unpredictable.

In one embodiment, based at least in part on determining that the second section is unpredictable, the method includes storing an indication that a second particular section of the corpus of code that corresponds to the second section of the modified corpus of code has a priority for the further code analysis. A first particular section of the corpus of code that corresponds to the first section of the modified corpus of code may not have such an indicated priority for the further code analysis. The method may perform various actions based on determining that the second section has a priority for further code analysis, including, for example, causing display of a recommendation to analyze the second section of the modified corpus of code based on the stored indication.

The stored text patterns determined to be irrelevant for further analysis may include a variety of text patterns determined to be irrelevant for a variety of reasons. In one embodiment, the stored text patterns include programming language constructs that are natively syntactically understood according to a programming language used by one or more of the code projects. In the same or another embodiment, the stored text patterns include logical constructs that are used in code projects but not natively syntactically understood according to a programming language used by one or more of the code projects. In the same or another embodiment, the stored text patterns include text values that are used in code projects but not natively syntactically understood according to a programming language used by one or more of the code projects and not defined as a logical construct in one or more of the code projects.

The method may involve code projects in same or different languages, and stored text patterns in same or different languages. In one embodiment, the method further includes determining a particular natural language that occurs in the code project and selecting first text patterns as the text patterns specific to the particular natural language. Other text patterns may be stored that are specific to a different particular natural language. The first text patterns may be different than the other text patterns.

In various embodiment, the code or text to be analyzed may be filtered before, after, in parallel with, synchronously, or asynchronously with determining an unpredictability of the text. Such filtering may include determining a frequency of occurrence of at least one section among the sections, and, based at least in part on determining that the at least one section frequently occurs among the sections, removing the at least one section from a candidate set of sections for the priority for further code analysis.

In one embodiment, the unpredictability score is or accounts for a Shannon entropy determined for a given section as, for each species encountered in the given section, an aggregate of a product of a probability of a portion of the given section described by the species and a log of an inverse of the probability of the portion of the section described by the species. In the same or a different embodiment, the unpredictability score is or accounts for a password strength. The text of a given section may be treated as a password input to determine the password strength.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
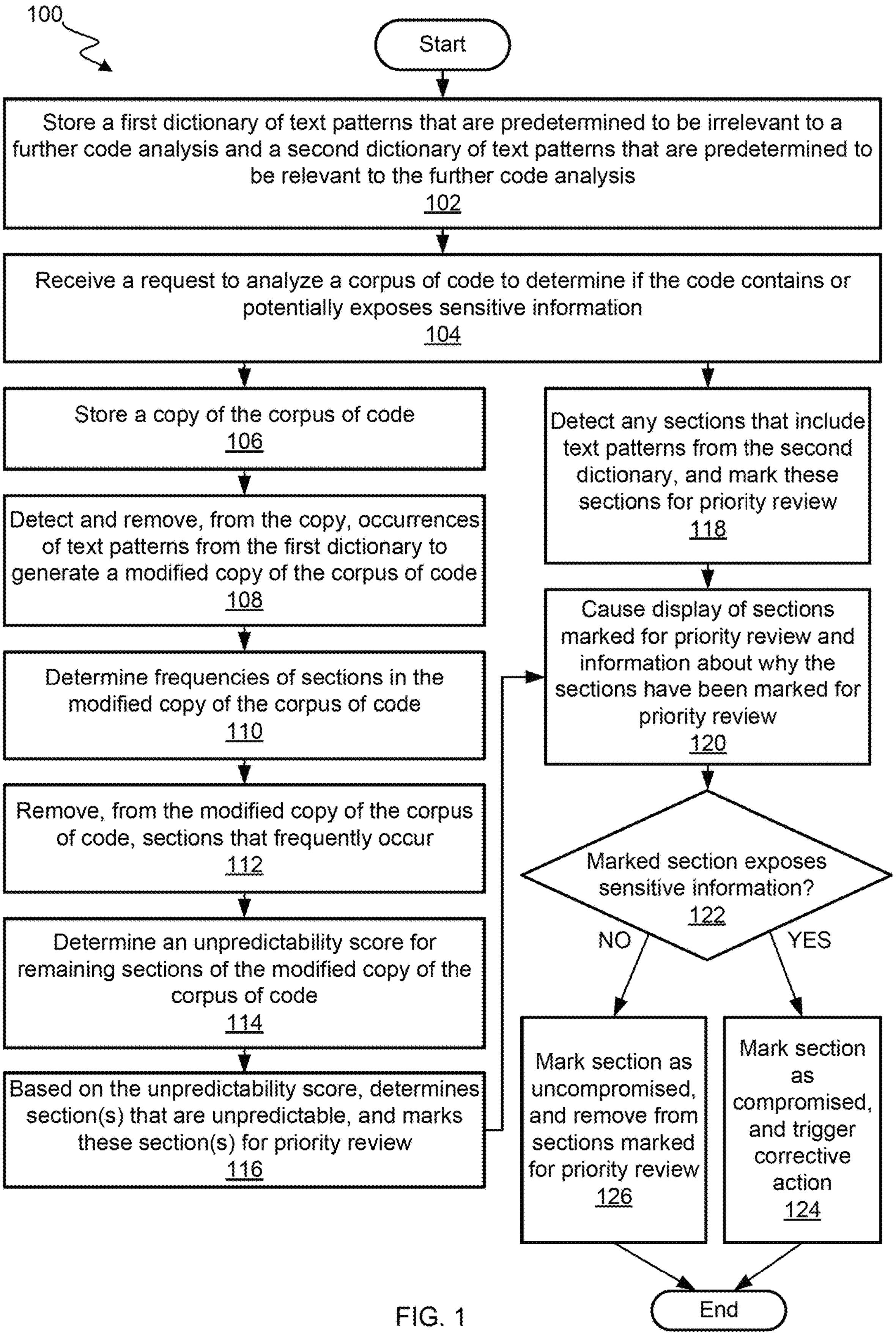
FIG. 1 is a flow chart showing an example flow for processing a corpus of code to determine an unpredictability of various sections of the corpus of code.

Code and text processing and analysis tools are described herein for finding potentially sensitive information in a corpus of code or text. Information that has not been filtered out as non-sensitive may be analyzed to determine an unpredictability score of the information, for example, based on the information entropy, the password strength, the complexity, the run unpredictability, and/or the statistical randomness of the information. The unpredictability score is used to flag or otherwise prioritize review of sections of code that are determined to be unpredictable, with other sections of code not being similarly prioritized. Prioritized sections may be listed separately, optionally in order of the unpredictability score, to facilitate efficient review of the corpus of code or text for sensitive information.

In various embodiments, the code or text processing and analysis tools are implemented using non-transitory computer-readable storage media to store instructions which, when executed by one or more processors of a computer system, cause display of user interface(s) and processing of received input to process and analyze the corpus of code or text. The code or text processing and analysis tools may be implemented on a local or cloud-based computer system that includes processors and a display for showing the user interface to a user.

A description of the code or text processing and analysis tools are provided in the following sections:

SECURITY VULNERABILITIES IN UNANALYZED CODE
EXTRACTING CODE FOR ANALYSIS
IDENTIFYING TEXT PATTERNS LIKELY IRRELEVANT TO CODE ANALYSIS
FILTERING OUT IRRELEVANT TEXT PATTERNS
FILTERING OUT FREQUENTLY OCCURRING SECTIONS
DETERMINING UNPREDICTABILITY OF REMAINING TEXT
IDENTIFYING TEXT PATTERNS THAT ARE LIKELY RELEVANT TO CODE ANALYSIS
ANALYZING CODE FOR SECURITY ISSUES
ANALYZING NON-CODE SOURCES FOR UNPREDICTABLE TEXT
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Security Vulnerabilities in Unanalyzed Code

As used herein, "sensitive information" refers to information that is present in a corpus of code or text that is accessible to individuals outside boundaries of information protection or security policies, explicit or implied, that protect an owner and/or users of the corpus of code or text. For example, some code may contain secrets, passwords, encryption keys, certificates, hash values, usernames, tokens, encoded cipher texts, and other sensitive information in a manner that allows the sensitive information to be exposed beyond security boundaries of the sensitive information (e.g. outside the company or otherwise to a larger group than intended).

Passwords are often short enough for a human to remember (4-64 characters or bytes) but otherwise highly unpredictable. Encryption keys, certificates, and tokens are often considerably longer (16-512 characters or bytes, with encryption keys being 16-256 characters or bytes, certificates being 128-512 characters or bytes, and tokens being 180+ characters or bytes) and generated randomly or otherwise in a manner that is difficult to predict. Hash values, such as SHA-256, are also typically longer than passwords (32-64 characters or bytes) and are the result of algorithms selected for their randomness qualities. Encoded cipher texts may be of any length but are often longer (16+ characters or bytes) and more unpredictable. Usernames may be sensitive, are generally shorter (4-64 characters or bytes), and are sometimes unpredictable but sometimes predictable. Much of the sensitive information above involves a considerable amount of contiguous text that is unpredictable in nature.

The sensitive information may be embedded in code by innocent actors inadvertently violating security policies or bad actors maliciously attempting to expose sensitive information handled by the code. The possibility for bad actors increases when a number of software developers accessing, modifying, and using a code base increases. In some examples, a vulnerability planted by one entity or company may compromise or reach another entity or company if the entities share a common code base for established functionality. For example, an exposed secret from a trusted partner may be used to authenticate into systems on both sides of the partnership.

Sometimes, compromised code can be introduced to a code project during a testing phase that may not involve any sensitive information, where a back door is included on purpose, potentially by a good actor, to facilitate testing. If the back door is not removed before production, the back door compromises security of the code project as sensitive information is introduced and exposed.

In some scenarios, the compromised portion of the code is hidden or nested within other portions of code, potentially by a bad actor working on the code project, and the compromised portion of the code base may never be analyzed to detect the compromised code. Such compromised code could be hidden in code bases with millions of lines of code spread over thousands of files. With such a large code base of interconnected objects, human reviewers have little chance of ever discovering the compromised code until sensitive information has already been exposed and potentially used maliciously.

In large open source projects or other scenarios with large shared code bases, such vulnerabilities could impact the entities using the code bases without their knowledge and without any practical ability for the entities to discover that their code bases are compromised with code that exposes sensitive information.

If a code base is compromised with a vulnerability that potentially exposes sensitive information, the sensitive information may be discovered by the same or other bad actors and used to breach privacy constraints for the same or different entities or companies, gain access to other confidential information for the same or different entities or companies, or gain control of a system to perform malicious actions against the same or different entities or companies. Such misuse of the sensitive information may not occur simultaneously with modifications to compromise the code base. This makes it particularly difficult to know whether a code base is compromised and waiting for a bad actor to come along, if a bad actor has already come along to expose sensitive information, or if the code base is secure from bad actors.

Sensitive information often has a high degree of unpredictability or randomness. Otherwise, the sensitive information could be easily guessed by a non-privileged human actor or bad actor. Techniques described herein narrow down a larger set of text to a smaller set of text to review for sensitive information by focusing on the unpredictability or randomness in the text, after removing the clutter, keywords, language syntax, and other ordinary text patterns that may otherwise be present in the text.

Described herein are techniques to identify unpredictable text in a corpus of code or text, regardless of the language of the text and surrounding text. The unpredictable text is then used to prioritize certain portions of the corpus of code or text for further review. For example, the code or text may be reviewed to determine whether secrets or other sensitive information are contained therein, for example, hard-coded in the file or document, in scenarios where the code or text would not be expected to contain sensitive information. A reviewer may be automatically assigned such that the reviewer is proficient in the programming language of the section(s) under review as well as the natural languages of the section(s) under review, and/or the section(s) may be translated to a programming language or natural language preferred by the reviewer.

Upon detection of sensitive information incorrectly in the code or text, the sensitive information may be flagged for removal or automatically removed, and the code or text containing the sensitive information may be marked for triaging to confirm whether the sensitive information was exposed, to mitigate further loss of the sensitive information, to re-secure logins, passwords, certificates, tokens, and other authentication pathways impacted by exposure of the sensitive information, to automatically notify impacted parties, for example, via email, and to prepare and file mandatory reports about any potential data breach.

Further details are provided in the following sections about detecting potentially sensitive information and triggering a review focused on the sections containing the potentially sensitive information, as well as actions that may be taken as a result of the review.

Extracting Code for Analysis

In one embodiment, a code processing tool includes a user interface for identifying a corpus of code to be processed, for example, by specifying or selecting one or more paths to and/or one or more addresses of code in the corpus of code, and optionally providing credentials to access the corpus of code along the specified path(s) and/or at the specified address(es). If a path is specified, the code processing tool may determine all source code files at the path to be included in the analysis. The code processing tool may also receive, as input via the user interface, additional criteria to filter down the corpus of code. For example, the code processing tool may only look at code that includes or references specified libraries or groups of libraries, or code that is accessible to specified users or groups of users, etc.

Figure 2:
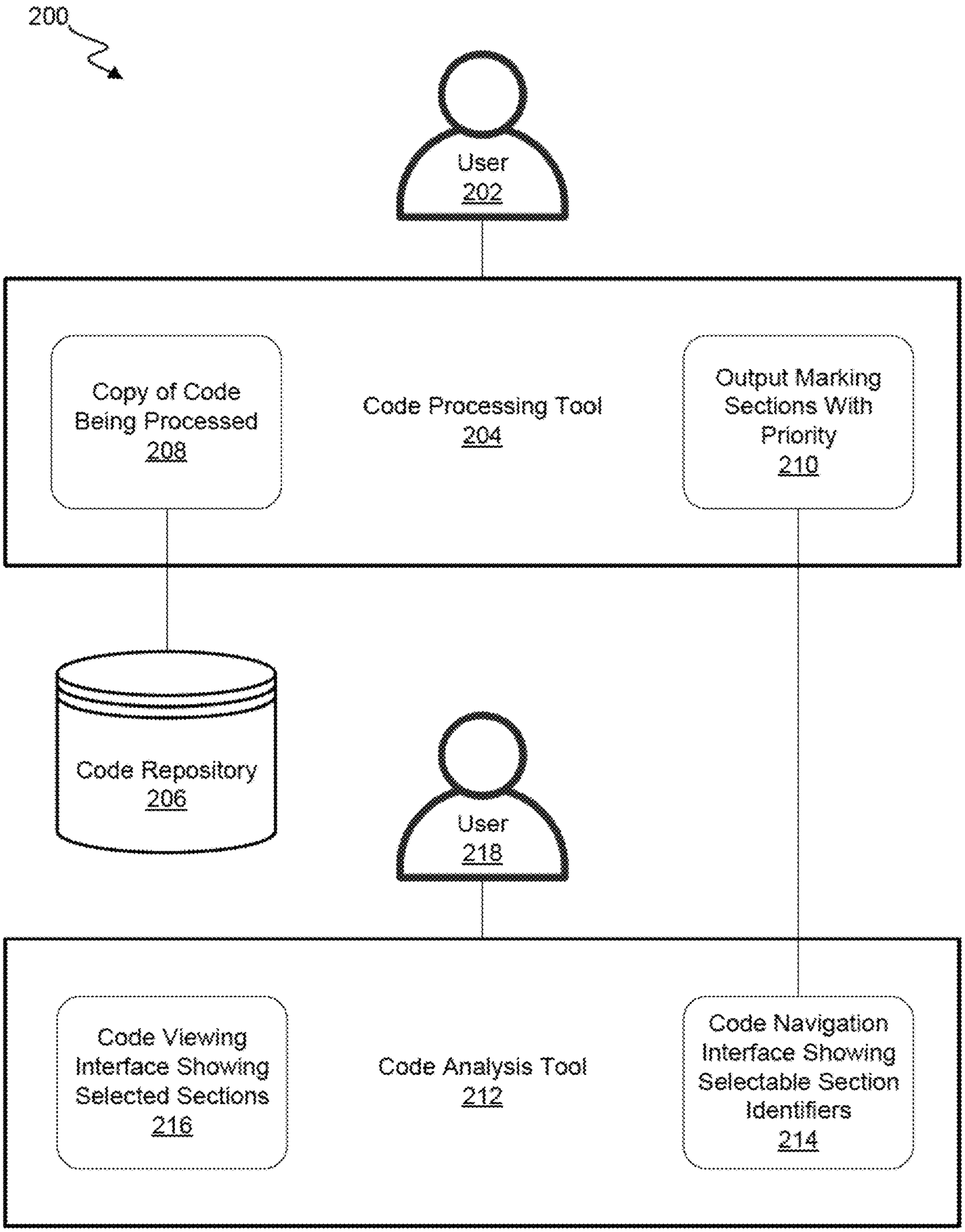
FIG. 2 illustrates a computer system that includes a code processing tool for processing a corpus of code to determine an unpredictability of various sections of the corpus of code.

As shown in FIG. 2, user 202 interacts with code processing tool 204, for example, using a graphical user interface or a command-line user interface. Code processing tool 204 retrieves code to be processed from code repository 206 and stores a copy of the code being processed 208. Code processing tool processes the code and provides output 210 marking sections of the code with priority. Output 210 is consumed by code analysis tool 212, which provides interfaces to user 218, which may be the same or a different user than user 202. A code navigation interface 214 shows selectable section identifiers that have been marked for priority review, and a code viewing interface 216 shows the textual content of selected sections and other sections contiguously before and after selected sections, as well as section metadata such as section numbers.

As used herein, a "section" of code may be a line, a set of lines, an object, logical resource or container, or any other contiguous and identified set of characters of a code project. In one embodiment, sections of code are separated by carriage returns so that each section is a separate line. In this embodiment, the line number and line count are preserved, for example, so that output may reference lines of the original document. In another embodiment, sections of code are separated by ";" or another section delimiter, with section numbers and section counts preserved.

The corpus of code may include a plurality of files that include a plurality of sections or lines of code, and the corpus of code may be extracted from one or more data structures of a code project. In this way, the corpus of code being processed in an analytics environment (not a production environment) may be a copy of another corpus of code that exists in a production environment. For example, a code project may be stored in a structured directory, with different code sources referencing each other, and the code processing tool may retrieve each code source referenced in or by the directory, file, or location to determine an overall corpus of code, which is a copy of code from the various sources.

Process 100 of FIG. 1 shows an example flow for processing a corpus of code to determine an unpredictability of various sections of the corpus of code. Process 100 begins at block 102 to store a first dictionary of text patterns that are predetermined to be irrelevant to a further code analysis and a second dictionary of text patterns that are predetermined to be relevant to the further code analysis. Although both dictionaries are mentioned in example process 100, in various embodiments, either dictionary or both may be stored to help identify sensitive information in code projects.

Process 100 continues at block 104 to receive a request to analyze a corpus of code to determine if the code contains or potentially exposes sensitive information. In response to the request, a code processing tool may perform either or both steps in blocks 106 and/or 118, in series or in parallel if both performed. Further processing may involve, in block 106, storing a copy of the corpus of code. The copy may be used to determine whether the code contains or potentially exposes sensitive information.

Identifying Text Patterns Likely Irrelevant to Code Analysis

The code processing tool maintains a dictionary of text patterns that are likely irrelevant to further code analysis, for example, to determine whether the code is compromised by exposing sensitive information. The code processing tool or a user may predetermine this set of words to be likely irrelevant based on a variety of factors, and the likely irrelevant words may then be removed from a code project before determining which sections of the code project should be further analyzed.

In one embodiment, the code processing tool maintains, as part of a dictionary of text patterns to remove from code projects before determining how predictable the text is in the code project, text patterns that include programming language constructs that are natively syntactically understood according to a programming language used among the code projects. Non-limiting examples of these programming language constructs include, but are not limited to: #include, #define, #if, #ifdef, #ifndef, #line, #undef, #pragma, #else, #error, #elif, #endif, auto, else, long, switch, break, enum, register, typedef, case, extern, return, union, char, float, short, unsigned, +, -, /, *, ;, :, ,, =, ==, other commonly used punctuation, etc. Each of these terms signals functionality to the programming language regardless of the structure or libraries that are part of the code project.

In one embodiment, the code processing tool maintains, as part of the dictionary of text patterns to remove from code projects, text patterns that include logical constructs that are used in code projects but not natively syntactically understood according to a programming language used among the code projects. Non-limiting examples of these logical constructs include common function names, common variable names, add, subtract, multiply, divide, get, set, put, retrieve, find, fetch, link, URL, API, display, render, max, min, etc. In some languages, some of these logical constructs may be natively understood. In other languages, these text patterns may be included in logical constructs that are present in common libraries used for the language. In either scenario, the text patterns may be excluded from further analysis when attempting to isolate a portion of the code that is compromised by attempting to disclose sensitive information. In one embodiment, the code processing tool does not remove logical constructs that are not natively syntactically understood according to a programming language used among the code projects unless such logical constructs include or equate to a dictionary word. These logical constructs may hide a password, for example, in a variable name, in which case keeping the logical construct in the code project allows the high entropy of the password to be detected.

In a further embodiment, the code processing tool maintains, as part of the dictionary of text patterns, words in each of the languages that may be present in code projects. The code processing tool may store, as part of the dictionary, text patterns specific to each of their natural languages. Each term in the dictionary may include, as metadata, the languages for which the term makes sense as a term to remove from the code projects. When processing a given code project, the code processing tool may determine which natural language (English, Chinese, Hindi, Arabic, etc.) occurs in the code project and select, based on the metadata, the text patterns from the dictionary specific to the particular natural language.

Text patterns may occur in different languages and may be labeled with metadata indicating which language(s) use the text patterns. In various examples, different portions of the code base may be written in same or different languages, optionally with mixed language comments. One portion of the code base may be written in Zhpy, also known as "Chinese Python," with other portions of the code base written in Japanese Ruby, English (standard) Java, Qalb (Arabic). The text of the code may be stored in any format, and UTF-8 or UTF-16 are popular formats for storing text as these formats support all languages. For English-based code bases, the text pattern of "error" may be used to filter the word "error" out of the code base. Similarly, "خطأ" (meaning "error" in Arabic) may be stored as a text pattern to filter out of code bases that include Arabic characters; "错误" (meaning "error" in Chinese) may be stored as a text pattern to filter out of code bases that include Chinese characters; and "गलती" (meaning "error" in Hindi) may be stored as a text pattern to filter out of code bases that include Hindi characters. In this manner, common words and phrases used in coding can be filtered out of code bases regardless of the language they occur in.

Different languages may have many different ways to represent the same word. For example, the word "parent" may use different characters, have different spellings, and different variations in various languages, and all of these different variations may be mapped to the word "parent" for that language. The dictionary entry for the word may have a many-to-one mapping ("padre" and "madre" in Spanish), in terms of spellings and variations, for some languages and a one-to-one mapping ("parent" in English), in terms of spellings and variations, for other languages. Other words may not exist at all in some languages. For these words, they may be stored in a dictionary and associated only with the languages they occur in.

In some embodiments, all dictionary words in each language are recognized as text patterns to be removed. In other embodiments, a subset of dictionary words are recognized as text patterns to be removed. For example, words that might be excluded are "password," "key," "login," etc., or words or phrases that likely have meaning when attempting to find portions of text that contain sensitive information. In one embodiment, a whitelist includes a dictionary of words or phrases to keep and not replace, and a blacklist includes a dictionary of words or phrases to replace and not to keep. The blacklist may be applied only to text that is not whitelisted, or vice versa. In another embodiment, the removal text has an order of priority that indicates which text is removed first. In another embodiment, priority is given to remove the longest detected text patterns first, followed by the shortest detected text patterns. In this manner, text like "INT" would get removed after "INTEGER" so that the text of the code is not left with "___EGER" but instead is left with "_______".

Filtering Out Irrelevant Text Patterns

Process 100 of FIG. 1 continues after the code processing tool stores a copy of the corpus of code in block 106, to detect and remove, from the copy, occurrences of text patterns from the first dictionary to generate a modified copy of the corpus of code in block 108. The modified copy may be further processed to narrow down the sections of code that may contain sensitive information.

In one embodiment, stored text patterns are compared against word chunks in each section of the code base or other corpus of code. A word chunk is a portion of text in the section that is delimited according to rules of the programming language. Many programming languages delimit sections using spaces, and word chunks may be contiguous portions of text between spaces. Additional spaces, delimiters, punctuation, connecting characters (‘-’, ‘_’, ‘ ’, ‘.’, ‘,’, ‘:’, ‘;’, ‘/’), and special characters may be removed prior to processing by the code processing tool. Text patterns from a dictionary of text patterns that are likely not part of a password, key, secret, certificate, or token may be matched against the word chunks. If any of the word chunks match the patterns, the corresponding word chunks may be removed to form a modified corpus of code, optionally including replacement text for the removed word, such as an "_" character. The code processing tool may remove certain types of text patterns before removing others. For example, in one embodiment, the code processing tool may filter out text patterns that include programming language constructs that are natively syntactically understood according to a programming language before filtering out text patterns that include words common to the corresponding native language. Words for certain native languages more likely to be present in the corpus of code or text, such as English, may be filtered out before words from other native languages that are less likely to be present in the corpus of code or text, such as Arabic or Chinese.

In one embodiment, a code processing tool removes detected text patterns in the code that are unlikely to be relevant to further code analysis, for example, analysis to discover compromised code in the form of secrets embedded in the code. The detected patterns may be wholly removed, leaving the remaining text in the wake of the removed text. Alternatively, the detected patterns may be removed and replaced with a consistent, predictable character, such as a space, "_", "#", "_", or any other character. The detected text pattern may be replaced by a single text character, by a number of text characters equivalent to a number of characters in the detected text pattern, or by any other number of text characters. Replacing all of the detected text patterns with the same text ensures that the detected text patterns do not contribute positively to the unpredictability or information entropy of the remaining text.

Removing the detected text patterns without replacing them may cause remaining text that was not initially adjacent to now be adjacent. Any further analysis on the modified text, after text pattern removal, may be less meaningful without knowing whether the text being analyzed was contiguously present in the original code. Substituting the text with a predictable character or characters allows the modified text to be further analyzed if needed, as contiguous text in the modified text would have also been contiguous in the original text of the code project.

the text patterns removed may be specific to the primary language, the secondary language(s), or both. In some embodiments, text patterns specific to other languages not involved in the code project or not matching the primary or secondary language(s) are not removed from the code project.

Table 1 below shows a snippet of original code from a code project that may be processed by a code processing tool to eliminate text patterns that are likely to be irrelevant to further code analysis.

TABLE 1

| Line | Code |
|---|---|
| 1 | // SPDX-License-Identifier: GPL-2.0-or-later |
| 2 | * about the stack segment/pointer. Also, we tell the compiler that |
| 3 | * everything could change. |
| 4 | lamp * p&8sdj9320jdhb378ppoLueri |
| 5 | |
| 6 | struct apm_bios _ call { |
| 7 | u32 func; |
| 8 | / * In and out * / |
| 9 | u32 ebx; |
| 10 | u32 ecx; |
| 11 | / * Out only * / |
| 12 | u32 eax; |
| 13 | u 32 edx; |
| 14 | u32 esi; |
| 15 | |
| 16 | / * Error: -ENOMEM, or bits 8-15 of eax */ |
| 17 | int err; |
| 18 | }; |
| 19 | |
| 20 | |
| 21 | / * Run _—_apm_bios_call or __—apm_bios_call_simple on CPU 0 * / |
| 22 | static int on_cpu0 (long (*fn) (void *), struct apm_bios_call *call) |
| 23 | |
| 24 | { |
| 25 | int ret; |
| 26 | / * Don't bother with work_on_cpu in the common case, so we don't |
| 27 | lamp char * passx = '43 سقبغعهمويرذ @er%$' |
| 28 | * have to worry about OOM or overhead. * / |
| 29 | if (get_cpu( ) == 0) { |
| 30 | ret = fn(call); |
| 31 | put_cpu( ); |
| 32 | } else |

In one embodiment, comments are filtered out of the code being analyzed. In another embodiment, comments are left in the code being analyzed. Secrets and confidential information may be contained within the comments, signaling what password or authentication credentials should be used to gain access to a resource. If such comments remain in the code, the comments themselves may be the source of a data breach.

Text patterns may be detected and removed from a corpus of code, which is a copy of production code. Removing occurrences of text patterns from the copied code generates or results in a modified corpus of code that omits the occurrences of the text patterns.

In one embodiment, different text patterns are removed based on a natural language of the corpus of code or code project. A particular natural language involved in the code project, such as a primary language or secondary language (s) used in the code project, is determined determining, and Table 2 below shows the snippet of code from Table 1 as processed by the code processing tool to eliminate text patterns that are likely to be irrelevant to further code analysis, resulting in modified code. In the example, the eliminated text patterns are replaced with an "=" character, but any other replacement character could be chosen. In another embodiment, the representation in Table 2 is an intermediate representation, and unpredictability or information entropy is determined after deleting all of the intermediate replacement placeholders, "=" in this case (or replacing the replacement placeholders with a null character). As shown, the modified code can be mapped back to the original code from Table 1 based on the line numbers, which are preserved in this example. In other examples, section mapping metadata may be created for the code project without preserving line numbers, and the section mapping metadata may be used to match sections of the modified code to sections of the original code.

TABLE 2

| Line | Code |
|---|---|
| 1 | ================Ident==ier=========0========= |
| 2 | ==========================po===er====so=========================== |
| 3 | =====================ange= |
| 4 | =======p&8sdj9320j==b378ppoLueri |
| 5 | |
| 6 | ==================c==\|== |
| 7 | u32=func= |
| 8 | ================== |
| 9 | u32=e=== |
| 10 | u32=e== |
| 11 | ================ |
| 12 | u32=e=== |
| 13 | u32=e=== |
| 14 | u32===i= |
| 15 | |
| 16 | ====Err======ENOMEM==========8-15====e===== |
| 17 | ====err= |
| 18 | == |
| 19 | |
| 20 | |
| 21 | ====================c==\|===============c==\|===============0==== |
| 22 | ==============cpu0=========fn============================c==\|==c==\|= |
| 23 | |
| 24 | = |
| 25 | ====ret= |
| 26 | ======n=t================================comm=================n=t |
| 27 | ========ar===pa==x===43 سقبغعهموپرذ @er%$= |
| 28 | ======================OOM================= |
| 29 | ====get=cpu======0=== |
| 30 | =====fn=c==\|== |
| 31 | ====cpu=== |
| 32 | ======== |

In one embodiment, the code processing tool includes a user interface for selecting the placeholder character. A null placeholder character may result in higher unpredictability values for each section as repetitive placeholder characters are eliminated. On the other hand, the repetitive nature of the replaced text may be lost when using the null placeholder, with high predictability scores being less desirable in some circumstances where most of the text in the section was predictable but replaced. The user can adapt the code processing tool to meet her/his needs via the user interface by changing the placeholder character and changing the thresholds being applied to scores and frequencies.

Filtering Out Frequently Occurring Sections

In one embodiment, the code processing tool maintains a growing dictionary of terms that are likely irrelevant to code projects. Once irrelevant text patterns have been removed in block 108 to create a modified copy of the corpus of code, code processing tool may, in one embodiment shown in FIG. 1, determine frequencies of sections in the modified copy of the corpus of code in block 110. After removing, from a given code project, text patterns that occur in the current dictionary in a first pass in block 108, the code processing tool may detect that several sections or lines of code are identical. For sections that frequently occur across one or many code projects, the code processing tool may learn that these sections are likely irrelevant to finding parts of the code projects that potentially expose sensitive information. As a result, these sections may be marked as frequently occurring and filtered out of the corpus of code or text. Referring back to FIG. 1, example code processing tool may remove, from the modified copy of the corpus of code, sections that frequently occur. In a second pass after block 108, the code processing tool may, in block 112, remove, from the modified copy of the corpus of code, sections that frequently occur. These frequently occurring text patterns are removed from the given code project as unlikely to contain sensitive information. These frequently occurring text patterns may also be added to the dictionary to be filtered out in a first pass on the next code project to be analyzed.

In one embodiment, different thresholds for frequency are used depending on the type of sensitive information being searched for in the corpus of code or text. For example, if searching for encryption keys, certificates, or cipher texts, the code analysis tool may use a threshold of 1 or 2 occurrences, filtering out any text patterns that occur more than once or twice in the corpus of code or text. Due to the length of these types of sensitive information, the code analysis tool would take little risk of missing the sensitive information even using such a low threshold. For tokens, the threshold may be increased slightly (for example, 2-5) due to the nature of tokens being frequently re-used in a code base. When searching for hash values, passwords, or usernames, even higher thresholds may be used before filtering out frequently occurring text.

In one embodiment, the frequency of occurrence of text in a section is stored in association with an unpredictability report for the section. Higher unpredictability scores and lower frequency of occurrence may be used to positively weight a likelihood that text of the section includes sensitive information. Such weights may be used in a code analysis tool to guide a reviewer to review the sections of code or text with priority given to the sections with higher weight.

Determining Unpredictability of Remaining Text

Referring to FIG. 1, after optionally removing frequently occurring sections in block 112, and optionally in combination with and after detecting any sections that include text patterns from the second dictionary of text patterns that are predetermined to be relevant to the further code analysis, the code processing tool may determine an unpredictability score for the remaining sections of the modified copy of the corpus of code in block 114. The unpredictability scores may be used to mark some sections as sufficiently unpredictable and other sections as not sufficiently unpredictable, based on unpredictability sufficiency criteria. In step 116, based on the unpredictability score, the code processing tool determines section(s) that are unpredictable, and marks these section(s) for priority review. Those sections that are sufficiently unpredictable and marked for priority review may be further processed by a code analysis tool.

Different sections of code may have different unpredictability scores indicating that some sections are more predictable or less predictable than others. The less predictable sections may be flagged for review, and the more predictable sections may be deprioritized or not otherwise flagged for review.

Regardless of the mode of determining unpredictability, the unpredictability of a single character or two characters is very low. As such, in one embodiment, the code processing tool filters out sections that have zero, one, or two characters of text, or any number of characters smaller than the minimum number of characters used by sensitive information being searched. For example, a search for encryption keys, certificates, or tokens may filter out larger sections of text before determining unpredictability, and a search for passwords, usernames, or hash values may filter out smaller sections of text before determining unpredictability.

Sensitive information often, but not always, has high information entropy. In other words, the sensitive information may be unpredictable even if part of the sensitive information is known, or the sensitive information may have a high degree of randomness.

For example, a password may have high information entropy on purpose to protect the information accessed by the password. If a password is "AAAAA," which has a high degree of predictability and a low degree of randomness, the password may be easily guessed by a bad actor even if the password is never shared with the bad actor. On the other hand, if the password is "7j8Go98JLa4k6s9A345Sdif," the bad actor may have difficulty guessing the password unless the password has otherwise been exposed to the bad actor.

In one embodiment, the information entropy is a Shannon entropy determined for a given section as, for each species encountered in the given section, an aggregate or sum of a product of a probability of a portion of the given section described by the species and a log of an inverse of the probability of the portion of the section described by the species. For example, the information entropy may account for the distribution of characters in the section, as well as how predictive each of these characters is to the text of the entire section.

In a specific example for determining Shannon entropy, text that includes "AABBBC" has three unique characters, "A", "B", and "C," and 6 characters total. The probability of "A" is 2/6 or 1/3; the probability of "B" is 3/6 or 1/2; and the probability of "C" is 1/6. The Shannon entropy may be calculated in text containing species A, B, and C as $$P(A)*\log_2\left(\frac{1}{P(A)}\right)+P(B)*\log_2\left(\frac{1}{P(A)}\right)+P(C)*\log_2\left(\frac{1}{P(C)}\right).$$

In this example, the Shannon entropy equals $$\frac{1}{3}*\log_2(3)+\frac{1}{2}*\log_2(2)+\frac{1}{6}*\log_2(6),$$

which is $$\frac{1}{3}*1.585+0.5*1+\frac{1}{6}*2.585=1.459167.$$

In a particular embodiment, the information entropy accounts not just for the distribution of characters within a text string but also for words within a dictionary of words.

In this embodiment, detected words that have not already been filtered out as irrelevant to code analysis may be condensed and treated as a single unique character that represents the unique word. In this manner, text that includes "and-or-the-and-the-or-the-and-the" may be reduced to "α-β-γ-α-γ-β-γ-α-γ" where "and" has been encoded as "α," or has been encoded as "β," and "the" has been encoded as "γ." The encodings be treated as a single character whether or not they are actually a single character, and the encodings represent the entire word encoded. In the example, the Shannon entropy of "and-or-the-and-the-or-the-and-the" is 3.04, but the Shannon entropy of "α-β-γ-α-γ-β-γ-α-γ" is only 1.81. The treatment of common words as characters may, in this example, better represent the higher predictability and lower variance of the text and the unlikelihood that the text is being used as a secret.

Table 3 below shows example information entropy scores determined for each of the sections or lines in the modified code from Table 2.

TABLE 3

| Line | Entropy Score |
|---|---|
| 1 | 1.43 |
| 2 | 0.75 |
| 3 | 0.93 |
| 4 | 3.77 |
| 5 | |
| 6 | 0.5 |
| 7 | 2.73 |
| 8 | 0 |
| 9 | 2 |
| 10 | 2 |
| 11 | 0 |
| 12 | 2 |
| 13 | 2 |
| 14 | 2 |
| 15 | |
| 16 | 1.8 |
| 17 | 1.3 |
| 18 | 0 |
| 19 | |
| 20 | |
| 21 | 0.52 |
| 22 | 0.99 |
| 23 | |
| 24 | 0 |
| 25 | 1.55 |
| 26 | 0.82 |
| 27 | 3.57 |
| 28 | 0.44 |
| 29 | 1.85 |
| 30 | 1.37 |
| 31 | 1.36 |
| 32 | 0 |

As shown, the information entropy scores for lines 4 and 27 are the only two scores above 3, and they are also above 3.5. In the example, if all lines with an information entropy score of below 3 were filtered out, the reviewer may look at at 2 out of the 32 lines of this sample with higher priority. In another example, the scores are clustered, for example, using k-means clustering, and a highest-score cluster is chosen for further review. The two lines with higher information entropy scores map back to these two lines of the original code, which may be marked for priority review:

Line 4: lamp*p&8sdj9320jdhb378ppoLueri

Line 27: lamp *char* * *passx* = '43سقبغعهمويرذ@*er*%$'

In other scenarios, a number of lines to review with priority may be reduced by orders of hundreds, thousands, tens of thousands, or even hundreds of thousands, saving reviewers hundreds or thousands of hours and, as a result, possibly avoiding false negatives (sections of compromised code otherwise missed by manual review).

In various examples, a threshold unpredictability score for marking sections for priority review may be chosen as a fixed cutoff (e.g., 3 or 3.5 in the example from Table 3), or a relative cutoff may be chosen (e.g., the top 1% or 5% of the scores for all of the sections of code). In some embodiments, the code analysis tool selects a threshold based on a type of potentially sensitive information being searched. For example, when searching for encryption keys, certificates, tokens, and cipher texts, the search analysis tool may perform a quick-pass search with a very high threshold of unpredictability (for example, 3-4 (encryption keys), 4-5 (certificates, tokens, and cipher texts), or greater information entropy. When searching for hash values, the threshold may be reduced, for example, to 2-3.5. Searching for passwords may involve lower thresholds, such as 1-3, and searching for usernames may involve even lower thresholds, such as 1-2.5. Depending on the sensitive information suspected of being in the corpus of code or text and the acceptable quantity of false positives that can be reviewed before finding a true positive, the threshold values may be adjusted accordingly.

In another example, the unpredictability score may be based at least in part on a length of the contiguous text for which no recognized text pattern has been replaced, and/or the threshold cutoff may be based on the length of the longest chunk of contiguous text being analyzed in the section. For example, the text "1111222233334444" has an information entropy score of 2, which is relatively low, but the text may be appearing contiguously in the code project without having any text patterns that have been removed by being nested within the text. In this example, the information entropy score of 2 may be increased based on a length of the word. For example, the information entropy score may be scaled based on the length of the contiguous text that contributed to the information entropy score. In this example, the contiguous text contributing to the score is 16 characters long, and the raw information entropy score is 2. The modified information entropy score may be determined as 2*In (16)=5.55. In comparison, the text "AABBCCDDEE" may be detected in another section, with a raw information entropy score of 2.32, slightly higher than that of "1111222233334444". If scaling based on length, though, the text "AABBCCDDEE" has only 10 characters and may have a modified score of 2.32*In (10)=5.34, which is lower than that of "1111222233334444". In this way, longer strings that have a fair degree of predictability can also be detected as potentially sensitive information, compared to shorter strings with a fair degree of predictability.

In the same or a different embodiment, a password strength is determined for a section of text and used to determine an unpredictability of the section of text. The text of a given section may be treated as a password input to a password checking tool determine the password strength. A high password strength may be, but is not always, synonymous with high entropy. For example, text of "ABCDEFGHIJKLMNOPQRSTUVWXYZ" has a high entropy but a poor password strength due to the predictable nature of the long tail of the password in light of the first few characters of the password. Therefore, the text is unlikely to be a password and more likely to be relevant to other content present in the code project. A low password strength for text can lead to a high predictability, and a high password strength can lead to a low predictability, the latter indicating potential for sensitive information to be contained in the text.

In the same or a different embodiment, Kolmogorov complexity is determined for a section of text and used to determine an unpredictability for the section of text. The Kolmogorov complexity of a section of text is a shortest known deterministic description that fully reproduces the section of text. For example, a text such as "ABCDEFGHIJKLMNOPQRSTUVWXYZ" may be described as "A to Z" or "A|-|Z" which is 5-6 characters long rather than 26 characters long. As another example, "1111222233334444" may be described as "1111|*2|*3|*4," which is 13 characters long rather than 26 characters long. From Line 4 in the example above, "p&8sdj9320jdhb378ppoLueri" may be described most simply as "p&8sdj9320jdhb378ppoLueri," which is 25 characters long. A low complexity for text can lead to a high predictability, and a high complexity can lead to a low predictability, the latter indicating potential for sensitive information to be contained in the text.

In the same or a different embodiment, the code processing tool determines whether or not a section of text or a portion thereof is statistically random or not and a length of any portion of the text that is statistically random. The text or a portion thereof is statistically random if the text or portion has no recognizable patterns or regularities. The statistical randomness score may be the length of any portion of text that is determined to be statistically random. For example, "ABCDEFGHIJKLMNOPQRSTUVWXYZ" may have a statistical randomness score of 1 because the first one character starts a pattern that describes the entire text. As another example, the text "p&8sdj9320jdhb378ppoLueri" includes a repeated "p" near the middle but otherwise has no known pattern. Even after removing the extra "p", the statistical randomness score is 24 counting each of the remaining characters. A low statistical randomness for text can lead to a high predictability, and a high statistical randomness can lead to a low predictability, the latter indicating potential for sensitive information to be contained in the text.

In the same or a different embodiment, the Wald-Wolfowitz runs test is used to determine whether the text has significantly more or less runs (contiguous repeats of a same character) than would be expected for random data of a same length. The test determines how many runs are expected in a random normal distribution of data and whether a number of runs actually in the text is significantly more or less than the number of runs expected. If the number of runs is significantly more or less than the number of runs expected, the length of the string may be discounted by the number of characters in missing or excess runs. For example, the text "1111222233334444" has 4 runs of 4 characters and, given a number of characters available would be expected to have 0 runs. Based on this, if all runs were eliminated, the run unpredictability of the text is 4, "1234". In another example, for text "p&8sdj9320jdhb378ppoLueri," the run unpredictability is 24. A low run unpredictability can lead to a high predictability, and a high run unpredictability can lead to a low predictability, the latter indicating potential for sensitive information to be contained in the text.

In various embodiments, other known or later developed algorithms can be used to determine an unpredictability or randomness of the text, and this unpredictability or randomness can be used to determine an overall unpredictability score for the text.

In one embodiment, multiple methods of determining unpredictability scores are combined together, optionally after normalizing the values to a scale between 0 and 1, to determine an overall unpredictability score for the text (with 1 being the most unpredictable in a normalized scenario). Different types of unpredictability metrics have different initial scales. For example, Shannon entropy has a scale between 0 and 7, and the complexity has a scale up to the size of the section. The different metrics can be scaled down to 0 to 1 by determining the maximum practical (reasonably likely) value for the range and dividing all values for the metric by that value. For example, the password strength, the complexity, run unpredictability, the statistical randomness, and the information entropy may be normalized, averaged, otherwise aggregated together, or otherwise used together to determine an overall unpredictability score for the text.

Time savings are greater when human reviewers can skip large files or regions of code. For that reason, in one embodiment, a given file or region of code (possibly including many sections) may be given an unpredictability score of the highest scoring section of code in the given file, a quantity of sections of code in the given file with unpredictability scores above a threshold, an average scoring section of code, or some other aggregate of the scores of the sections of code within the given file. The entire file or region of code may be marked with priority for further analysis, while other files, regions of code, or sections may not be similarly marked with priority for further analysis. In this manner, the human reviewer can focus on fewer files, regions of code, and sections than otherwise would be involved.

In one embodiment, the code processing tool sorts files in the code project by file entropy and sections or lines in the code project by section entropy, with references or links to the corresponding file or section, respectively, in the sorted lists. The sorted lists and links to the corresponding source text may be used by a code analysis tool to investigate the corresponding source text for incorrect inclusion of sensitive information. The code processing tool may also associate the section with a frequency of how often text of the section recurred among the corpus of text (across all files) or within a single file, and the frequency may be shown by the code analysis tool. The frequency may be used for sorting or reference as the code is further analyzed.

Below is an example output of JSON metadata analyzing a code sample. As shown, the output lists the line or section number, text value, frequency of the same text value, and entropy of the text value.

```
{
  "Analysis Meta Data": {
    "[ANZ] Analyzer Tool": "osaFrequency Analyzer",
    "[ANV] Analyzer Version": "1.0.0",
    "[OFN] Original File Name": "C:\\Users\\\\Docs\\sourcewithsecrets.c",
    "[LDT] Local Date Time": "2023-11-03 13:35:38.796105",
    "[FSZ] File Size (bytes)": 5046,
    "[TLC] Total Line Count": "244",
"[CLP] Command-Line Parameters": "['osaFrequency Analyzer.py',
'C:\\\\Users\\\\\\\\Docs\\\\sourcewithsecrets.c']"
  },
  "Line Analysis Data": [
    {
      "linenum": "27",
      "lineVal":
"\u0633\u0642\u0628\u0627\u063a\u0639\u0647\u0645\u0648\u067e\u0631\u063043@er %
$".
      "xcount": "1",
      "entropy": "4.247927513443583"
    },
    {
      "linenum": "52",
      "lineVal": "ywlrcm52dwg0jjgzkeajlgwus0q3wv",
      "xcount": "1",
      "entropy": "4.1898980954642875"
    },
    {
      "linenum": "4",
      "lineVal": "p&8sdj9320jb378ppolueri",
      "xcount": "1",
      "entropy": "4.0559581516151235"
    },
    {
      "linenum": "91",
      "lineVal": "compaqtura325cwhi01",
```

-continued

```
        "xcount": "1",
        "entropy": "3.9841837197791885"
      },
      ...
    }
}
```

Lines 4 and 27 are otherwise shown in Tables 1-3, leading up to the example output file shown above. The entropy values in Table 3 are lower than the entropy values shown above because Table 3 calculated the entropy values including the placeholder character "="; whereas, the output above uses a null character for the placeholder, leading to higher entropy = values. Either approach is acceptable.

In another example, the code processing tool can output a file that specifies, in a "File Analysis Data" section, the files analyzed and the highest section unpredictability scores for each of the files, and, in a "Section Analysis Data" section, the top unpredictability scores for sections in the files being analyzed as well as section numbers for the corresponding sections. In another embodiment, file analysis data and section analysis data are combined such that each entry of section data in a report is accompanied by a filename or other identifier of the file where the section is from, a file entropy of the file, a section entropy, and/or a file path. The entries may be sorted by section entropy, by file entropy then section entropy, or according to any other value determined herein. Any values determined by the code processing tool may be assembled in an output file that is consumable by a code analysis tool for reviewing sections of code, file by file, region (of a file) by region (of a file), section by section, or in any other format offered by the code analysis tool.

Identifying Text Patterns that are Likely Relevant to Code Analysis

In response to the request to analyze the corpus of code received in block 104, the code processing tool detects any sections that include text patterns from the second dictionary of text patterns that are predetermined to be relevant to the further code analysis, and marks these sections for priority review in block 118. These sections may be marked before, after, or in parallel with the sections marked based on their unpredictability. The code processing tool may coordinate with a code analysis tool in block 120 to cause display of sections marked for priority review and information about why the sections have been marked for priority review and allow further analysis of the sections. These sections may be identified in parallel to, or in combination with, sections identified in block 116 based on the unpredictability score.

In one embodiment, the code processing tool includes a dictionary of text patterns and/or Regular Expressions that are often present when sensitive information is included in text. For example, terms like "password," "token," and "certificate" may be flagged when occurring with a large chunk of contiguous text, and expressions like "password=", "token=", or "certificate=" may be similarly flagged. These text patterns may be detected in the text whether or not there are any unpredictable text sections detected in the text. Specific Regular Expressions may be included in the dictionary for specific passwords or other sensitive information known ahead-of-time, based on the number of characters and character-set known to be required for the password or other sensitive information.

Using Unpredictability to Prioritize Code Analysis

Referring to FIG. 1, the code analysis tool provides an option for the user to view the sections of code in a user interface and determine, in block 122, whether a marked section exposes sensitive information. If the marked section exposes sensitive information, in block 124, the code analysis tool may mark the section as compromised and trigger corrective action, optionally in coordination with further user input about what corrective action to take. If the marked section. If the marked section does not expose sensitive information, in block 126, the code analysis tool may mark the section as uncompromised and remove the marked section from the sections marked for priority review.

Figure 3:
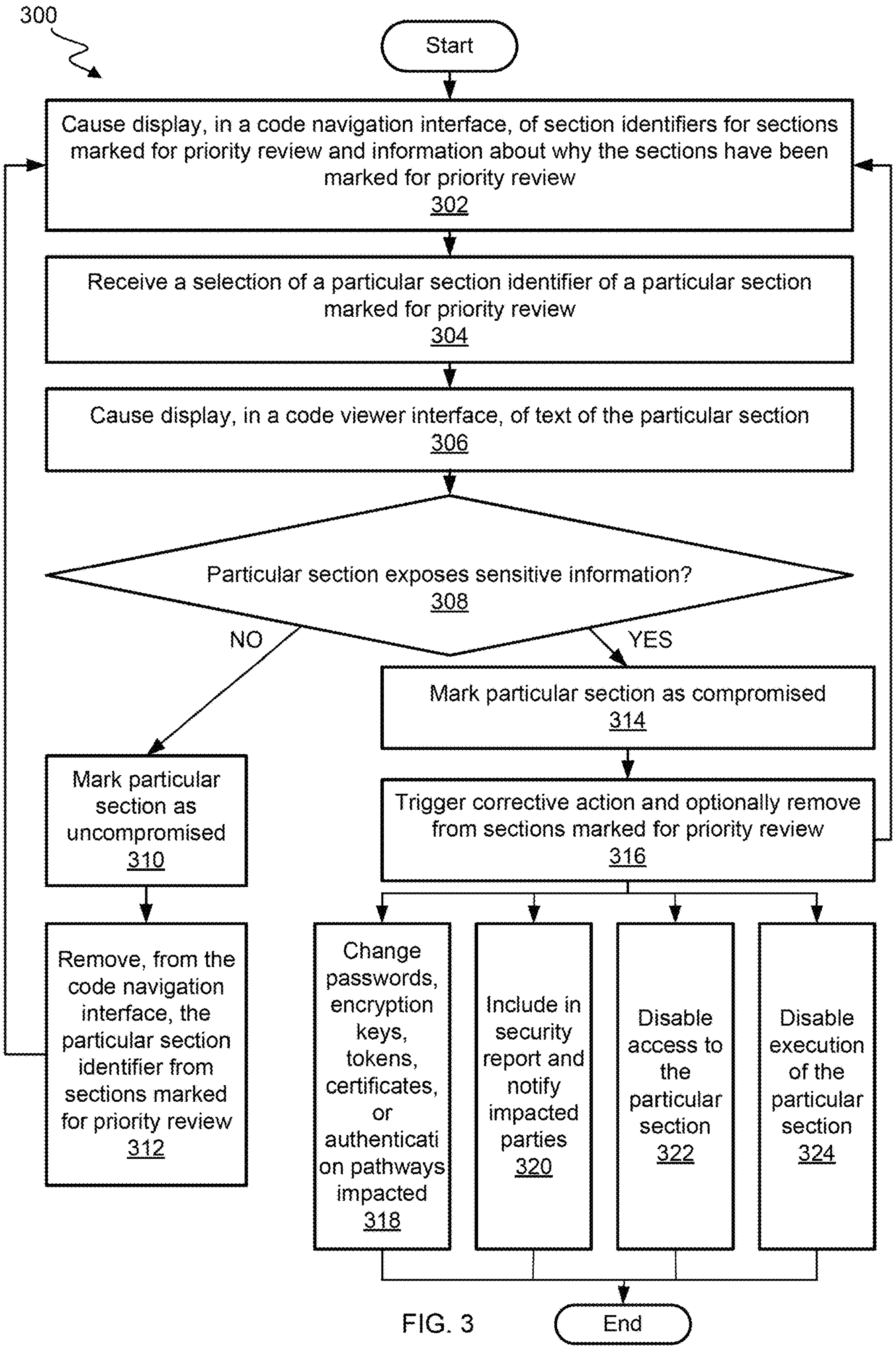
FIG. 3 is a flow chart showing an example flow for reviewing and marking sections of code that are determined to be unpredictable.

Referring to block 302 of process 300 of FIG. 3, the code analysis tool causes display, in a code navigation interface, of section identifiers for sections marked for priority review and information about why the sections have been marked for priority review. In block 304, the code analysis tool may receive a selection of a particular section identifier of a particular section marked for priority review. Based on the selection of the particular section, in block 306, the code analysis tool causes display, in a code viewer interface, of text of the particular section. The user may then investigate the code and make a determination, in block 308, of whether the particular section exposes sensitive information. If the user determines that the particular section does not expose sensitive information, process 300 continues to block 310, where the code analysis tool marks the particular section as uncompromised. Then, code analysis tool may remove, from the code navigation interface, the particular section identifier from sections marked for priority review in block 312. Process 300 may continue to block 302 as additional sections are reviewed.

In one scenario, in block 308, the user may determine that a particular section exposes sensitive information. In that scenario, the code analysis tool marks the particular section as compromised in block 314 and triggers corrective action and optionally removes the particular section from sections marked for priority review in block 316. The corrective action may include any of the following: change passwords, encryption keys, certificates, or authentication pathways impacted 318, include the particular section in a security report and notify impacted parties 320, disable access to the particular section 322, or disable execution of the particular section 324.

Figure 4:
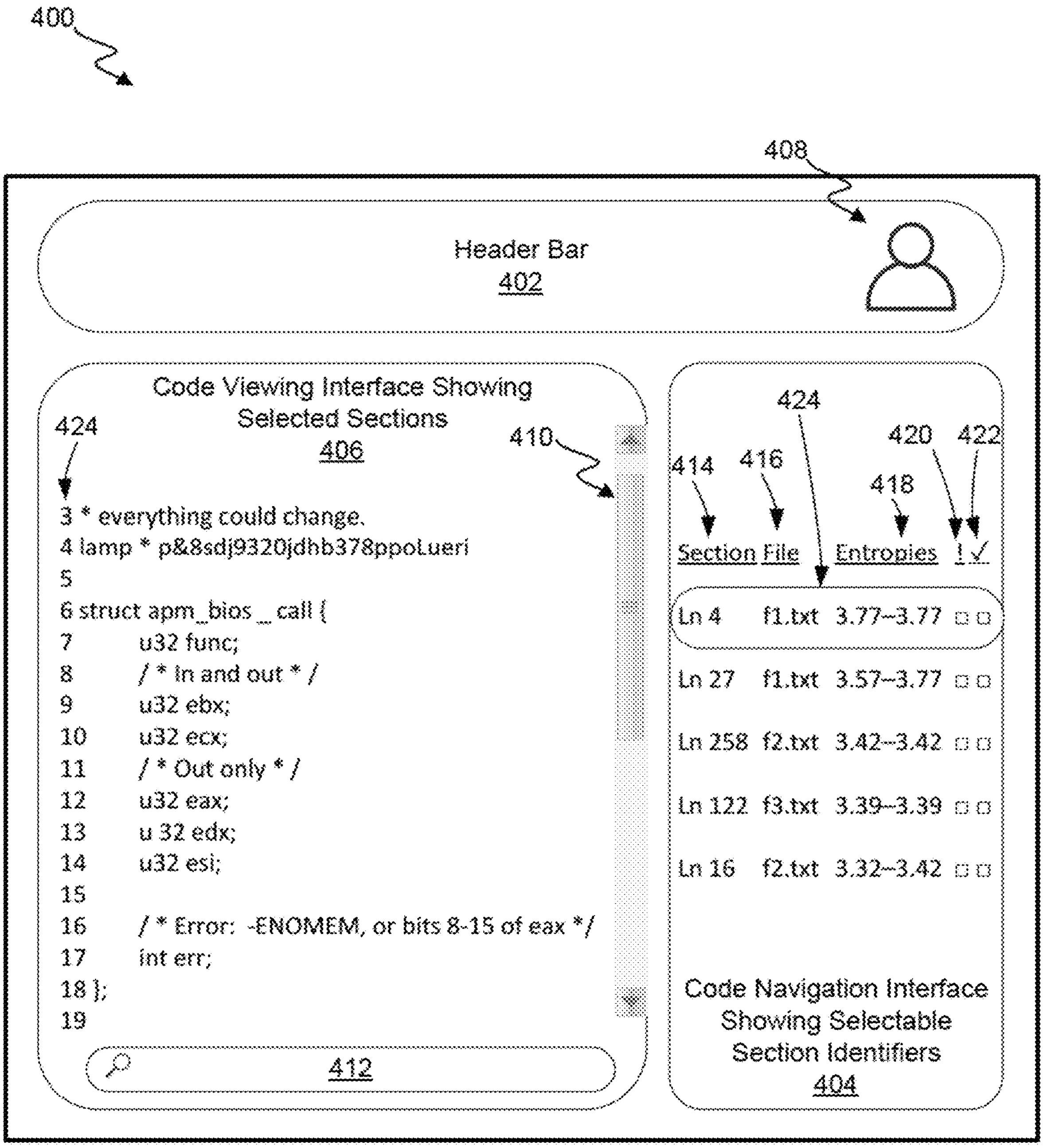
FIG. 4 illustrates a user interface for reviewing and marking sections that are determined to be unpredictable.

FIG. 4 shows an example user interface 400 including a code viewing interface 406 and a code navigation interface 404 for reviewing code sections including those sections marked for priority review. As shown, user interface 400 includes header bar 402 with an icon and information indicating which user is logged in, 408. Code viewing interface 406 includes a scrollbar 410, section numbers 424, and textual content, as well as a search bar 412 for searching the textual content of the file or region of the file shown.

Code navigation interface 404 includes information that identifies the section 414 as well as the file 416 that contains the section, and entropies 418 of both the section and the file that includes the section. As shown, the entropy of the section is provided before the entropy of the file, and the entropy of the file is equivalent to the maximum section entropy in the file. Code navigation interface 404 includes a graphical indication 424 of which section is selected for review in code viewing interface 406, as well as options to mark the sections as either exposing sensitive information, with checkboxes 420, or as reviewed and not exposing sensitive information, with checkboxes 422.

As shown, code navigation interface 404 includes sections sorted in order of highest section entropy or highest unpredictability to lowest section entropy or lowest unpredictability, with information about the file and file entropy also provided. After reviewing the selected section in code viewing interface 406, the user may select a checkbox 420 or 422 to indicate whether or not the section exposes sensitive information. Checking a checkbox 420 may cause the corresponding section to be included in a security report, triggered for corrective action, and optionally removed from the list of priority sections shown on code navigation interface 404. Checking a checkbox 422 may cause the corresponding section to be removed form the list of priority sections shown on code navigation interface 404.

In various embodiments, files, regions, or sections code may be flagged, marked, sorted, highlighted, included (with other sections or regions being excluded), or otherwise prioritized for further code review based on the unpredictability scores of sections of code in the file or region, or based on the unpredictability score of the section itself, in absolute terms or relative in comparison with other files, regions, or sections.

The code analysis tool may generate a structured report file, such as a report file formatted in JSON, containing all of the file names and related section information of the sections of code marked for priority review and optionally including other sections. The structured report file may be used to retrieve code from the original code or text files that contain the relevant section(s) for display to a reviewer for manual inspection.

In one embodiment, a code analysis tool provides a user interface for analyzing code marked or otherwise prioritized by the code processing tool for further review. The code analysis tool may include a code viewer interface that displays and allows scanning and browsing of currently selected section(s) of code, as well as a code navigator interface that shows unpredictability scores of different sections of code in the code project, optionally sorted or filtered based on a threshold to highlight or otherwise prioritize sections of code with relatively high (as compared with other sections), absolutely high (over a threshold), and/or top N (depending on space available in the UI) unpredictability scores and hide or deprioritize sections of code with relatively low (as compared with other sections), absolutely low (under a threshold), and/or bottom N unpredictability scores.

The code navigation interface may accept user input in the form of up/down arrows, left/right arrows, buttons, clicks, touches, swipes, or any other form of user input to transition between different files, regions, or sections of code. Upon transitioning from one file, region, or section of code to another, the code navigation interface causes the new file, region, or section to be displayed in the code viewer interface. The code navigation interface may also include hot keys or UI buttons to mark the file, region, or section of code as compromised (true positive suspicion initially marked based on text unpredictability or for another reason) or not compromised (false positive suspicion initially marked based on text unpredictability or for another reason).

The code viewer interface may include scrolling, panning, zooming, and searching functionality to facilitate efficient code review of the file, region, or section of code actively being reviewed.

The user interface may include an option to mark files, regions, or sections of code as not compromised, or not likely to expose sensitive information, or compromised, or likely to expose sensitive information. The selections may be made by a reviewing user on the user interface as files, regions, and sections of code are navigated to and reviewed. If marked as not compromised, the relevant file, region, or section may be removed from the code navigator interface that otherwise identifies files, regions, or sections of code for priority review.

If marked as compromised, the relevant file, region, or section may be added to a security report for the code project. The security report may highlight vulnerabilities and fixes needed to make the code secure. In one embodiment, marking a section of code comments as compromised causes the section of code comments to be immediately removed from the code package. As code comments are not compiled, there is little risk to removing the code comments when a recognized vulnerability is present.

Marking a section of functional code may cause a containing object, function, method, or other logical container to be disabled in the code project, such that other users no longer have access to the section of non-commented code. Because this option may have extreme consequences, the user interface may include one or more warning messages before disabling a logical container that includes the functional code. Although the consequences of this choice may be extreme, they may also still be desired if a significant vulnerability is found in the code during review.

In another embodiment, marking the section of code as compromised may cause a reviewing-user-specified text string to replace a text string of containing sensitive information in the section of code, without otherwise disabling any logical containers that include the functional code.

Causing display of some prioritized sections and not other non-prioritized sections serves as a recommendation to review the prioritized sections first. A code analysis tool may show the user prioritized sections first to recommend that the user review the prioritized sections first. In one embodiment, if a section is detected with above a notification-triggering threshold level of unpredictability, a separate notification is sent to the user to serve as an additional recommendation that the section be reviewed. Including the prioritized section in the list of sections for review serves as an adequate recommendation in other embodiments.

Analyzing Code for Security Issues

A reviewer may be automatically or manually assigned such that the reviewer is proficient in the programming language of the section(s) under review as well as the natural languages of the section(s) under review, and/or the section(s) may be automatically translated to a programming language or natural language preferred by the reviewer, according to the reviewer's profile.

A human or machine reviewer may investigate the prioritized code to determine if the code reveals a secret, certificate, password, token, or back door into the software project. For example, the secret may be hard coded into the software project in a manner that makes the secret discoverable by other developers and even by third parties or users via APIs.

If the code or other text is functional to reveal sensitive information to users outside outside a zone of authorized access (e.g., including users who should not otherwise have authorized access), or if the code or text itself is accessible to users outside a zone of authorized access, the code or text may be flagged as compromised, optionally triggering additional corrective action.

Analyzing Non-Code Sources for Unpredictable Text

Various embodiments are described herein as providing a code processing tool for prioritizing review of unpredictable text in a corpus of code, and a code analysis tool for analyzing code having unpredictable text. In one embodiment, a text processing tool may be used to prioritize review of unpredictable text in a corpus of text in one or more objects, files, or documents.

For example, the text processing tool may use natural language dictionaries corresponding to one or more languages to detect and remove text patterns from a corpus of text from one or more objects, files, or documents. Once the text has been removed and optionally replaced with a placeholder character to produce a modified text, the text processing tool may determine an unpredictability score for each section of the modified text, which may be each line, paragraph, page, chapter, or other division of the text. The unpredictability score may be determined using any of the techniques described herein, including optionally a combination of the techniques to determine an overall unpredictability score for the section of text.

The unpredictability score may be used to determine whether the section of text should be prioritized for further review or not. Sections with higher unpredictability may be prioritized for further review, and sections with lower unpredictability may not be prioritized for further review, or may be deprioritized for further review.

The unpredictability score may be used by a text analysis tool that includes a text navigation interface and a text viewing interface. The text navigation interface may include controls for reviewing the different sections, pages, chapters, or documents of text that were determined to be unpredictable and prioritized for further review. Once a section, page, chapter, or document is determined not to have sensitive information, the section, page, chapter, or document may be marked in the navigation interface as not compromised with sensitive information. This may cause the non-compromised section, page, chapter, or document to be removed from the navigation interface so the reviewer can focus on yet-to-be-reviewed sections, pages, chapters, or documents. If the section, page, chapter, or document is determined to have sensitive information, the section, page, chapter, or document may be marked in the navigation interface as compromised with sensitive information. This may trigger further review and/or automatic modification of the text document to remove the sensitive information. Unless the outcome of automatic modification is highly predictable, such as removing a piece of commented text that includes a password, automatic modification is discouraged as such automatic modification could create catastrophic failures that result in even greater losses of sensitive information. For this reason, in some embodiments, the tool might not include any options for automatic modification, or may limit those options to scenarios where the code being modified is present in commented portions or metadata not impacting execution of the code itself. Instead, the tool may suggest modification by a reviewer or software developer by highlighting the portion of the code where sensitive information is potentially exposed.

Figure 5:
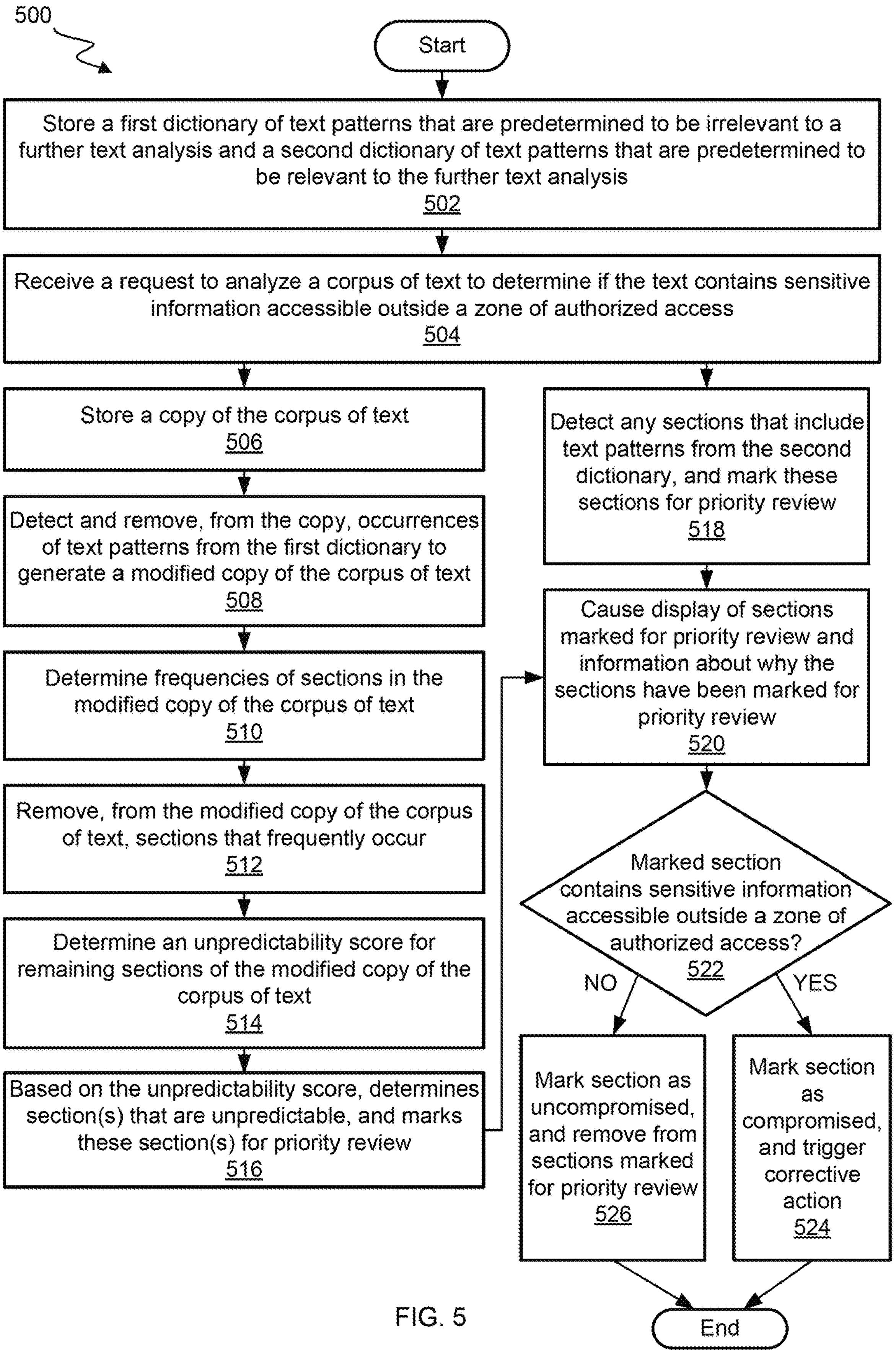
FIG. 5 is a flow chart showing an example flow for processing a corpus of text to determine an unpredictability of various sections of the corpus of text.

Process 500 of FIG. 5 shows an example flow for processing a corpus of text to determine an unpredictability of various sections of the text. Process 500 begins at block 502 to store a first dictionary of text patterns that are predetermined to be irrelevant to a further text analysis and a second dictionary of text patterns that are predetermined to be relevant to the further text analysis. Although both dictionaries are mentioned in example process 500, in various embodiments, either dictionary or both may be stored to help identify sensitive information in corpuses of text.

Process 500 continues at block 504 to receive a request to analyze a corpus of text to determine if the text contains sensitive information accessible outside a zone of authorized access. For example, a first determination is made on what users, groups, and/or roles should have access to the potentially sensitive text, and a second determination is made on what users, groups, and/or roles actually have access to the potentially sensitive text. Upon determining that more users have access than desired, or that the potentially sensitive text should not appear in any document, the text processing tool may take corrective action shown in block 524.

In response to the request from block 504, a text processing tool may perform either or both steps in blocks 506 and/or 518, in series or in parallel if both performed. Further processing may involve, in block 506, storing a copy of the corpus of text. The copy may be used to determine whether the text contains sensitive information accessible outside a zone of authorized access.

In response to the request to analyze the corpus of text received in block 504, the text processing tool detects any sections that include text patterns from the second dictionary and marks these sections for priority review in block 518. The text processing tool may coordinate with a text analysis tool in block 520 to cause display of sections marked for priority review and information about why the sections have been marked for priority review and allow further analysis of the sections.

Process 500 of FIG. 5 continues after the text processing tool stores a copy of the corpus of text in block 506, to detect and remove, from the copy, occurrences of text patterns from the first dictionary to generate a modified copy of the corpus of text in block 508. Then, in block 510, the text processing tool may determine frequencies of sections in the modified copy of the corpus of text. Next, in block 512, the text processing tool may remove, from the modified copy of the corpus of text, sections that frequently occur.

In block 514, text processing tool determines an unpredictability score for remaining sections of the modified copy of the corpus of text in order to predict whether any of those sections may contain sensitive information outside a zone of authorized access. Block 514 also includes determining section(s) that are unpredictable and marking these section(s) for priority review. Then, in block 520, a text analysis tool causes display of sections marked for priority review and information about why the sections have been marked for priority review.

The text analysis tool may provide a user with an interface to determine whether a marked section contains sensitive information accessible outside a zone of authorized access. If the text does contain sensitive information accessible outside a zone of authorized access, the text analysis tool may mark the section as compromised and trigger corrective action in block 524. If the section does not contain sensitive information accessible outside a zone of authorized access, the text analysis tool may mark the section as uncompromised and remove the section from the sections otherwise marked for priority review.

Figure 6:
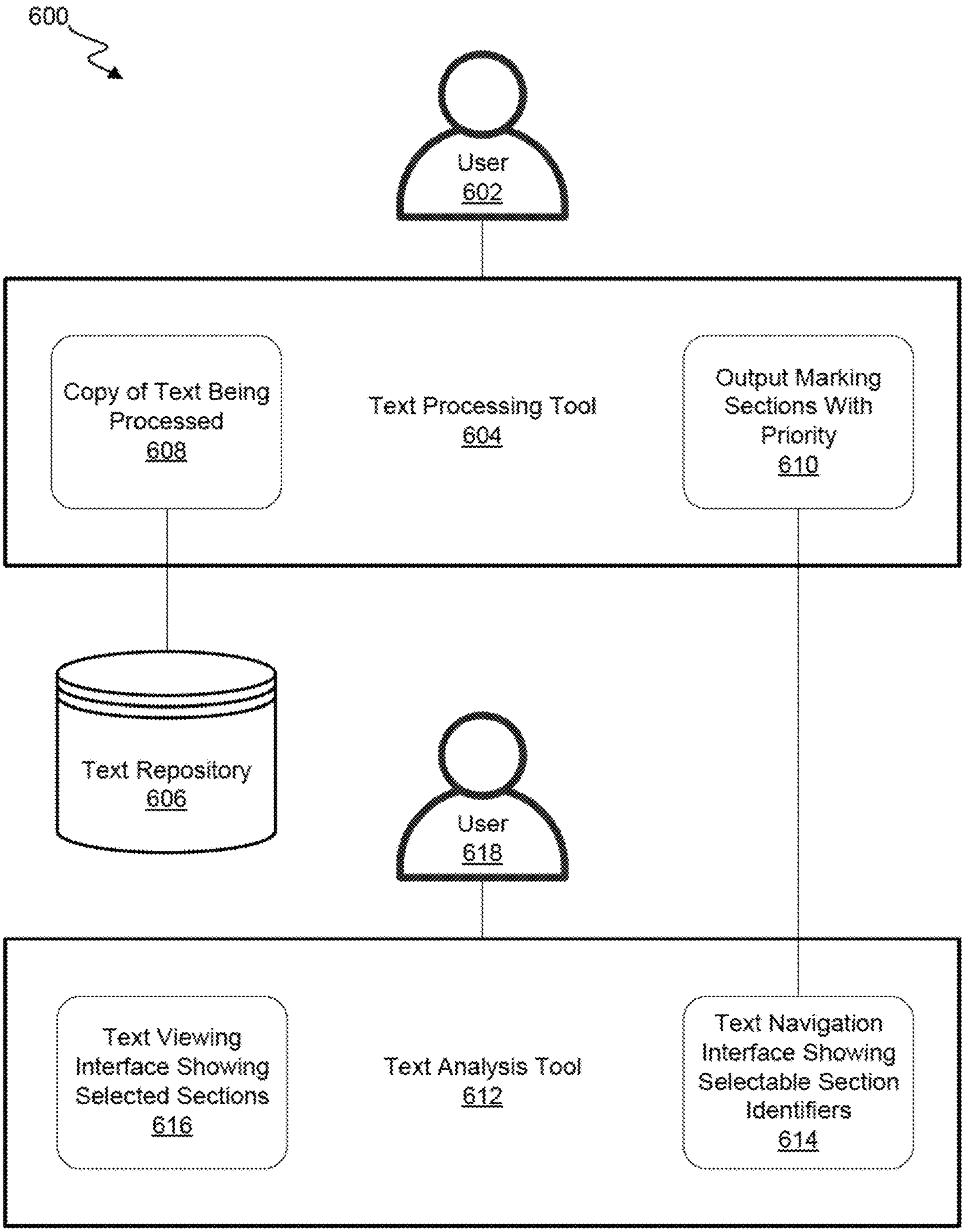
FIG. 6 illustrates a computer system that includes a text processing tool for processing a corpus of text to determine an unpredictability of various sections of the corpus of text.

FIG. 6 shows a diagram of a text processing tool 604 and a text analysis tool 612 for processing and analyzing text to find sensitive information accessible outside a zone of authorized access. User 602 interacts with text processing tool 604 via a user interface. Text processing tool 604 retrieves a copy of text being processed 608 from text repository 606. Once text 608 is finished being processed, text processing tool generates output 610 that marks sections with priority. Text analysis tool uses output 610 to show, in text navigation interface 614, selectable section identifiers of sections with priority review. Text navigation interface 614 causes display of selected sections in text viewing interface 616.

Figure 7:
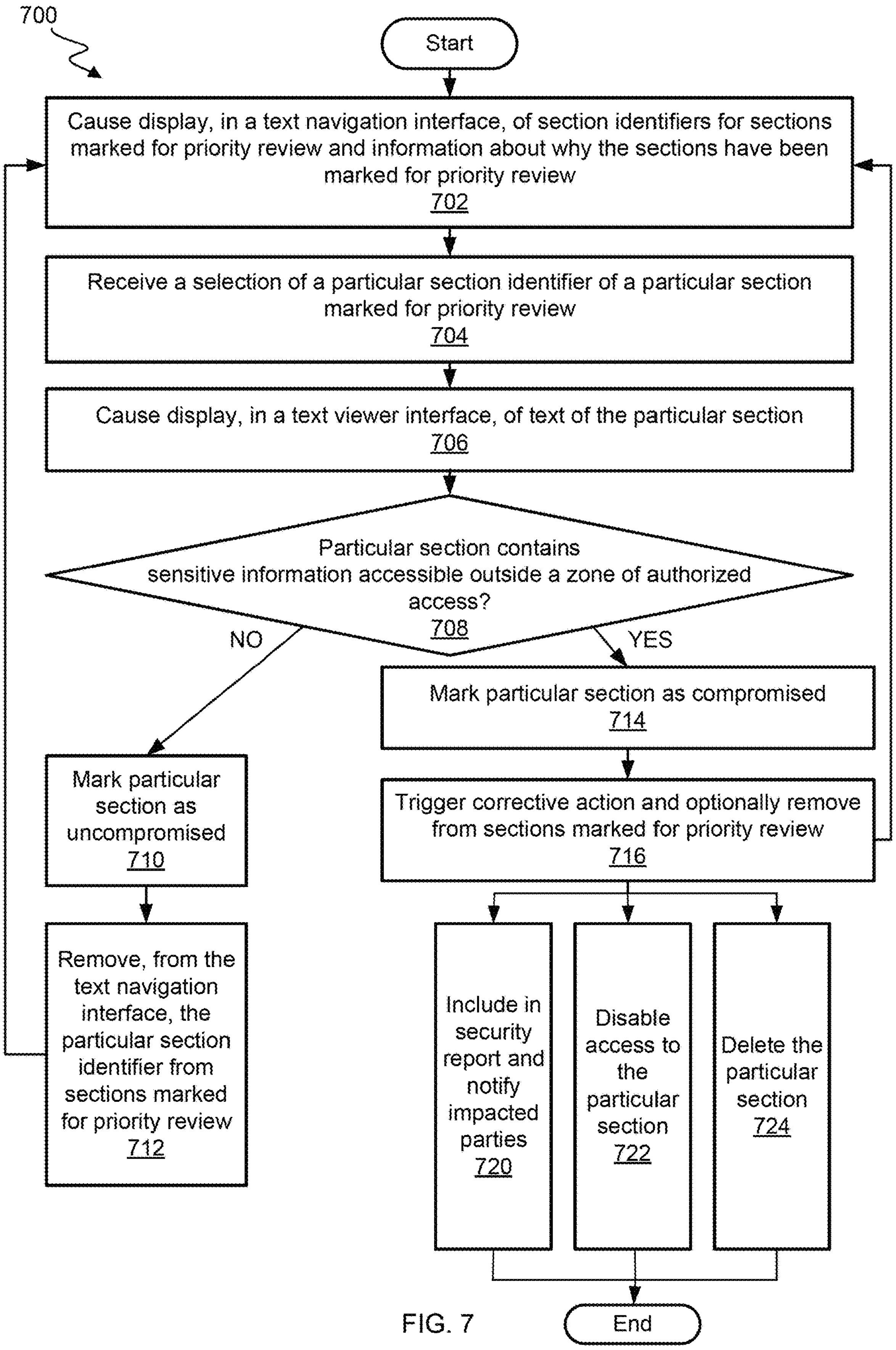
FIG. 7 is a flow chart showing an example flow for reviewing and marking sections of text that are determined to be unpredictable.

FIG. 7 shows a flow chart of a process for analyzing text to determine whether the text contains sensitive information accessible outside a zone of authorized access. In block 702, a text analysis tool causes display, in a text navigation interface, of section identifiers for sections marked for priority review and information about why the sections have been marked for priority review. In block 704, the text analysis tool receives a selection of a particular section identifier of a particular section marked for priority review. In block 706, the text analysis tool causes display, in a text viewer interface, of text of the particular section so a user may view the text and make a determination, in block 708, of whether the particular section contains sensitive information accessible outside a zone of authorized access. For example, the particular user may analyze the code to see if it contains information, such as passwords, confidential information, trade secrets, etc. that should not be written in documents accessible to users that have access to the corpus of text.

If the particular section does not contain such sensitive information, process 700 continues to block 710, where the text analysis tool marks the particular section as uncompromised. Along this path, the text analysis tool may remove, from the text navigation interface, the particular section identifier from sections marked for priority review in block 712, and continue displaying other sections for review in block 702.

If the particular section does contain such sensitive information, process 700 continues to block 714 to mark the particular section as compromised. The text analysis tool may also trigger corrective action and optionally remove the particular section from sections marked for priority review, in block 716. Example corrective actions include including the particular text in a security report and notify impacted parties (block 720), disable access to the particular section (block 722), or delete the particular section (block 724). As the text is not functional code, these corrective actions may have fewer risks than the corrective actions in blocks 318 and 322-324 of process 300.

Figure 8:
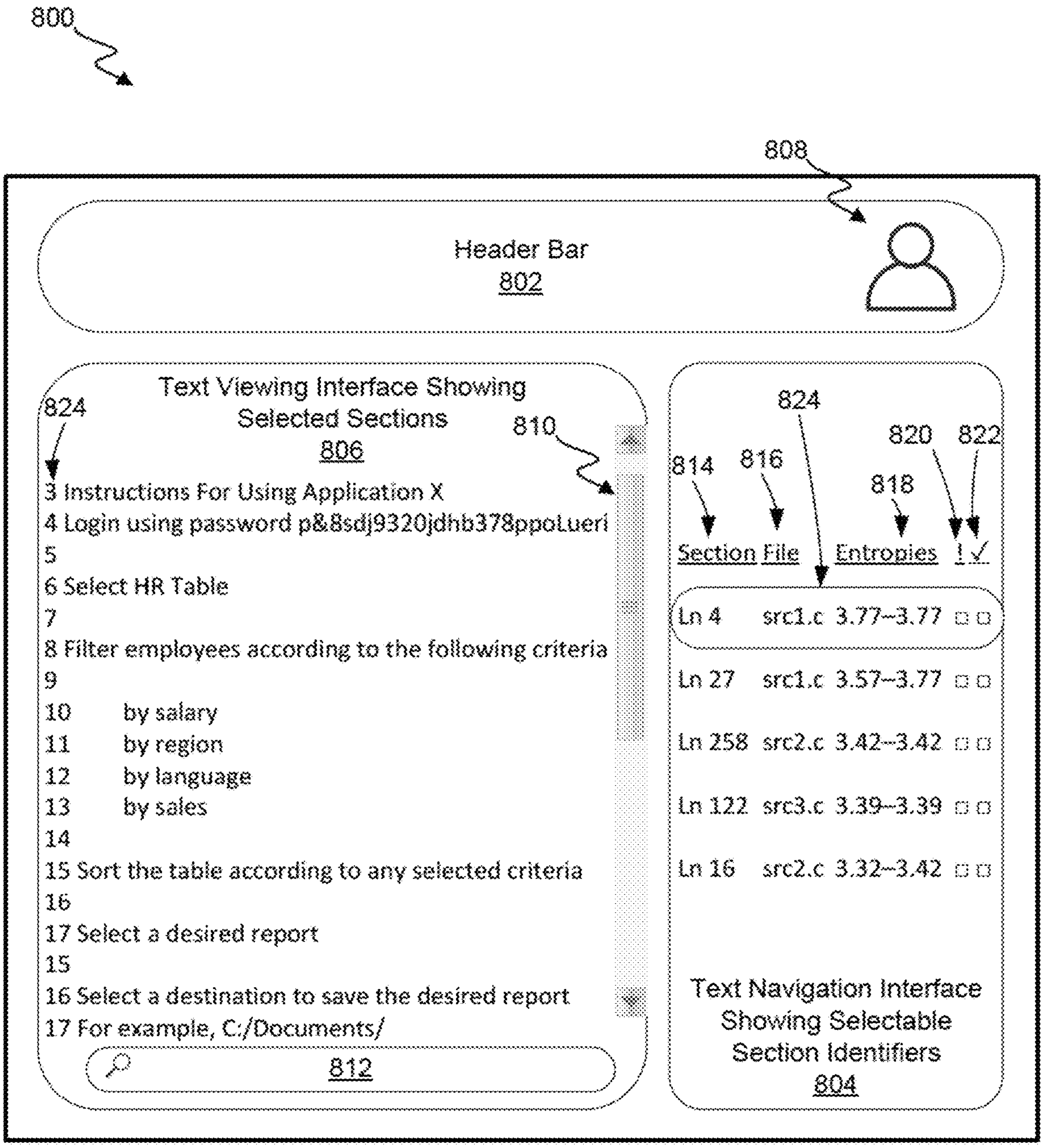
FIG. 8 illustrates a user interface for reviewing sections from a corpus of text that are determined to be unpredictable.

FIG. 8 shows an example interface 800 for reviewing text to determine if the text contains sensitive information that is accessible outside a zone of authorized access. Interface 800 includes header bar 802, which shows with selectable icon 808 which user is logged into the text analysis tool. Interface 800 also includes text navigation interface 804, which shows sections 814, files 816, and entropies 818. The entropies listed include entropies for the section followed by entropies for the file, which may match up with a highest entropy section. Text sections may be line numbers, pages, chapters, or any other contiguous chunk of text.

Interface 800 includes a graphical indication 824 that a section has been selected, and text viewing interface 806 shows the selected sections. Text viewing interface 806 includes a scroll bar 810 for scrolling up and down to adjacent content to the text content shown, and section numbers 824 for keeping track of where the content is in the file. Text viewing interface 806 also includes search bar 812 for searching text content in the selected file.

Text navigation interface 804 may further include a checkbox 820 for marking the section as containing sensitive information that is accessible outside a zone of authorized access, in which case the text analysis tool may trigger corrective action or include the section in a report. Text navigation interface 804 also includes a checkbox 822 for marking the section as reviewed and not containing sensitive information that is accessible outside a zone of authorized access, in which case the text analysis tool may remove the section from the sections listed for priority review by text navigation interface 804.

Computer System Architecture

Figure 9:
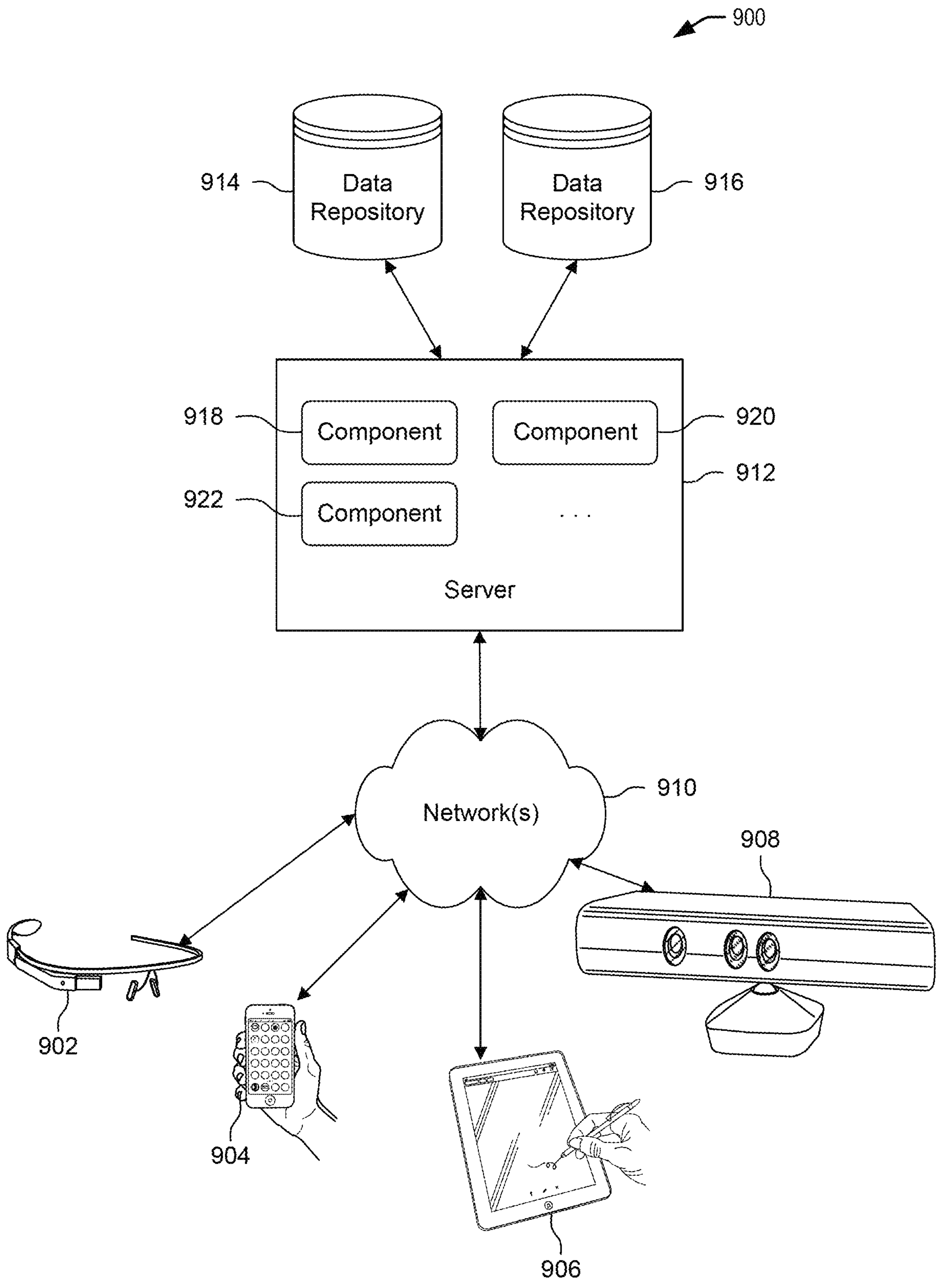
FIG. 9 depicts a simplified diagram of a distributed system for implementing certain aspects.

FIG. 9 depicts a simplified diagram of a distributed system 900 for implementing an embodiment. In the illustrated embodiment, distributed system 900 includes one or more client computing devices 902, 904, 906, 908, and/or 910 coupled to a server 914 via one or more communication networks 912. Clients computing devices 902, 904, 906, 908, and/or 910 may be configured to execute one or more applications.

In various aspects, server 914 may be adapted to run one or more services or software applications that enable techniques for processing code or text to identify unpredictable sections or files and/or review sections or files marked as unpredictable to determine if the sections or files incorrectly contain sensitive information.

In certain aspects, server 914 may also provide other services or software applications that can include non-virtual and virtual environments. In some aspects, these services may be offered as web-based or cloud services, such as under a Software as a Service (SaaS) model to the users of client computing devices 902, 904, 906, 908, and/or 910. Users operating client computing devices 902, 904, 906, 908, and/or 910 may in turn utilize one or more client applications to interact with server 914 to utilize the services provided by these components.

In the configuration depicted in FIG. 9, server 914 may include one or more components 920, 922 and 924 that implement the functions performed by server 914. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, 908, and/or 910 for techniques for processing code or text to identify unpredictable sections or files and/or review sections or files marked as unpredictable to determine if the sections or files incorrectly contain sensitive information. A client device may provide an interface that enables a user of the client device to interact with the client device. The client device may also output information to the user via this interface. Although FIG. 9 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 912 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 912 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 914 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 914 can include one or more virtual machines running virtual operating systems, or other computing architectures involving virtualization such as one or more flexible pools of logical storage devices that can be virtualized to maintain virtual storage devices for the server. In various aspects, server 914 may be adapted to run one or more services or software applications that provide the functionality described in the foregoing disclosure.

The computing systems in server 914 may run one or more operating systems including any of those discussed above, as well as any commercially available server operating system. Server 914 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 914 may include one or more applications to analyze and consolidate data feeds and/or event updates received from users of client computing devices 902, 904, 906, 908, and/or 910. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 914 may also include one or more applications to display the data feeds and/or real-time events via one or more display devices of client computing devices 902, 904, 906, 908, and/or 910.

Distributed system 900 may also include one or more data repositories 916, 918. These data repositories may be used to store data and other information in certain aspects. For example, one or more of the data repositories 916, 918 may be used to store information for techniques for processing code or text to identify unpredictable sections or files and/or review sections or files marked as unpredictable to determine if the sections or files incorrectly contain sensitive information. Data repositories 916, 918 may reside in a variety of locations. For example, a data repository used by server 914 may be local to server 914 or may be remote from server 914 and in communication with server 914 via a network-based or dedicated connection. Data repositories 916, 918 may be of different types. In certain aspects, a data repository used by server 914 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 916, 918 may also be used by applications to store application data. The data repositories used by applications may be of different types such as, for example, a key-value store repository, an object store repository, or a general storage repository supported by a file system.

In one embodiment, server 914 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 10:
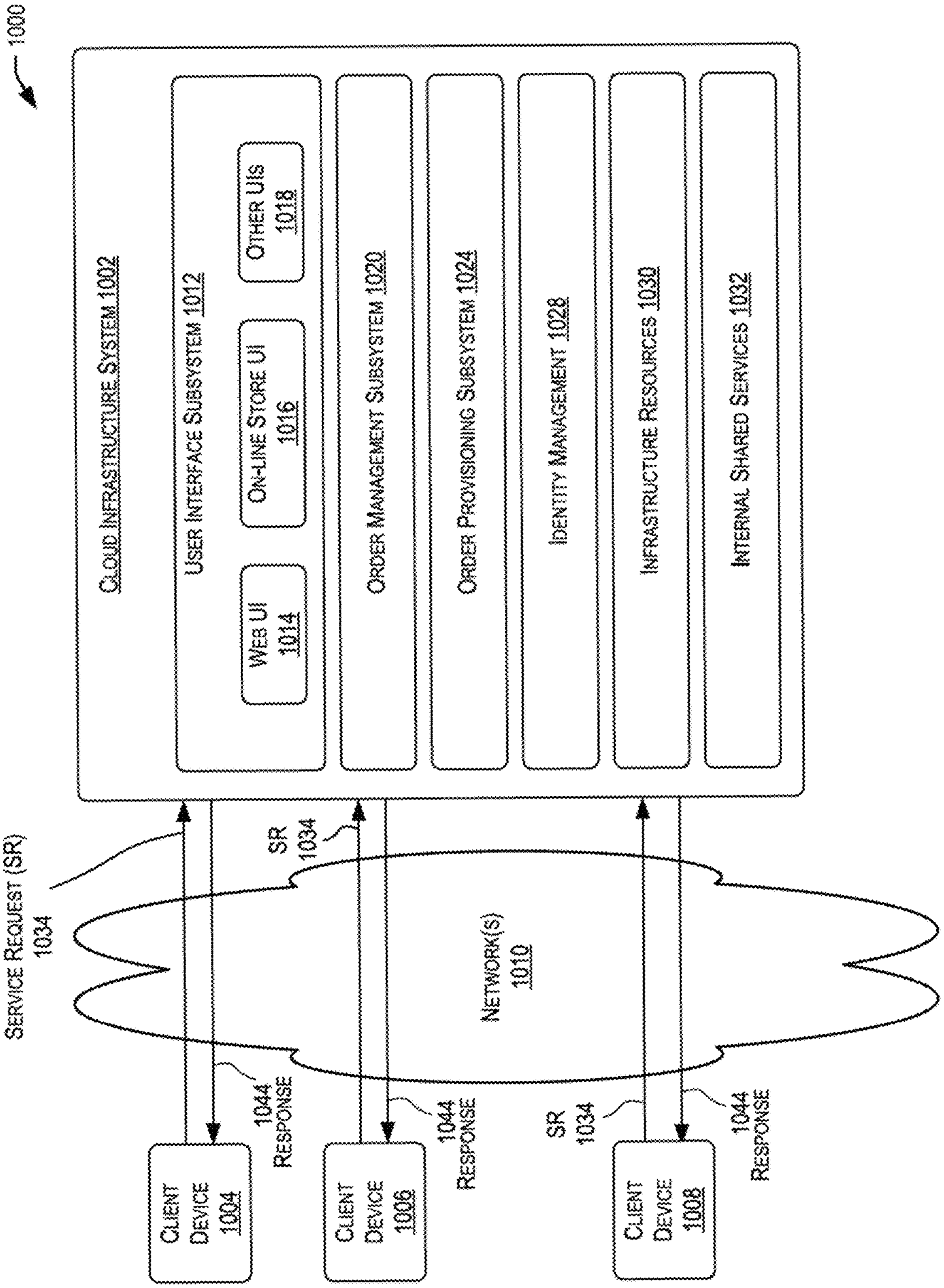
FIG. 10 is a simplified block diagram of one or more components of a system environment by which services provided by one or more components of an embodiment system may be offered as cloud services, in accordance with certain aspects.

In certain aspects, the techniques for processing code or text to identify unpredictable sections or files and/or review sections or files marked as unpredictable to determine if the sections or files incorrectly contain sensitive information. FIG. 10 is a simplified block diagram of a cloud-based system environment in which various text handling-related services may be offered as cloud services, in accordance with certain aspects. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other aspects, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative aspects.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1010 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1002. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a tenant, via a subscription order, may order one or more services provided by cloud infrastructure system 1002. Cloud infrastructure system 1002 then performs processing to provide the services requested in the tenant's subscription order. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public tenant, where the tenant can be an individual or an enterprise. In certain other aspects, under a private cloud model, cloud infrastructure system 1002 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request a chat bot service described in this disclosure.

In some aspects, the processing performed by cloud infrastructure system 1002 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for determining the intent of an utterance. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain aspects, to facilitate efficient provisioning of these resources for supporting the various cloud services provided by cloud infrastructure system 1002 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a tenant may, using a client device, request (service request 1034) one or more services provided by cloud infrastructure system 1002 using one or more of interfaces 1014, 1016, and 1018. For example, a tenant may access the online store, browse cloud services offered by cloud infrastructure system 1002, and place a subscription order for one or more services offered by cloud infrastructure system 1002 that the tenant wishes to subscribe to. The service request may include information identifying the tenant and one or more services that the tenant desires to subscribe to. For example, a tenant may place a subscription order for a Chabot related service offered by cloud infrastructure system 1002. As part of the order, the tenant may provide information identifying for input (e.g., utterances).

In certain aspects, such as the embodiment depicted in FIG. 10, cloud infrastructure system 1002 may comprise an order management subsystem (OMS) 1020 that is configured to process the new order. As part of this processing, OMS 1020 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1002 may send a response or notification 1044 to the requesting tenant to indicate when the requested service is now ready for use. In some instances, information (e.g., a link) may be sent to the tenant that enables the tenant to start using and availing the benefits of the requested services.

Cloud infrastructure system 1002 may provide services to multiple tenants. For each tenant, cloud infrastructure system 1002 is responsible for managing information related to one or more subscription orders received from the tenant, maintaining tenant data related to the orders, and providing the requested services to the tenant or clients of the tenant. Cloud infrastructure system 1002 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1002 may provide services to multiple tenants in parallel. Cloud infrastructure system 1002 may store information for these tenants, including possibly proprietary information. In certain aspects, cloud infrastructure system 1002 comprises an identity management subsystem (IMS) 1028 that is configured to manage tenant's information and provide the separation of the managed information such that information related to one tenant is not accessible by another tenant. IMS 1028 may be configured to provide various security-related services such as identity services, such as information access management, authentication and authorization services, services for managing tenant identities and roles and related capabilities, and the like.

Figure 11:
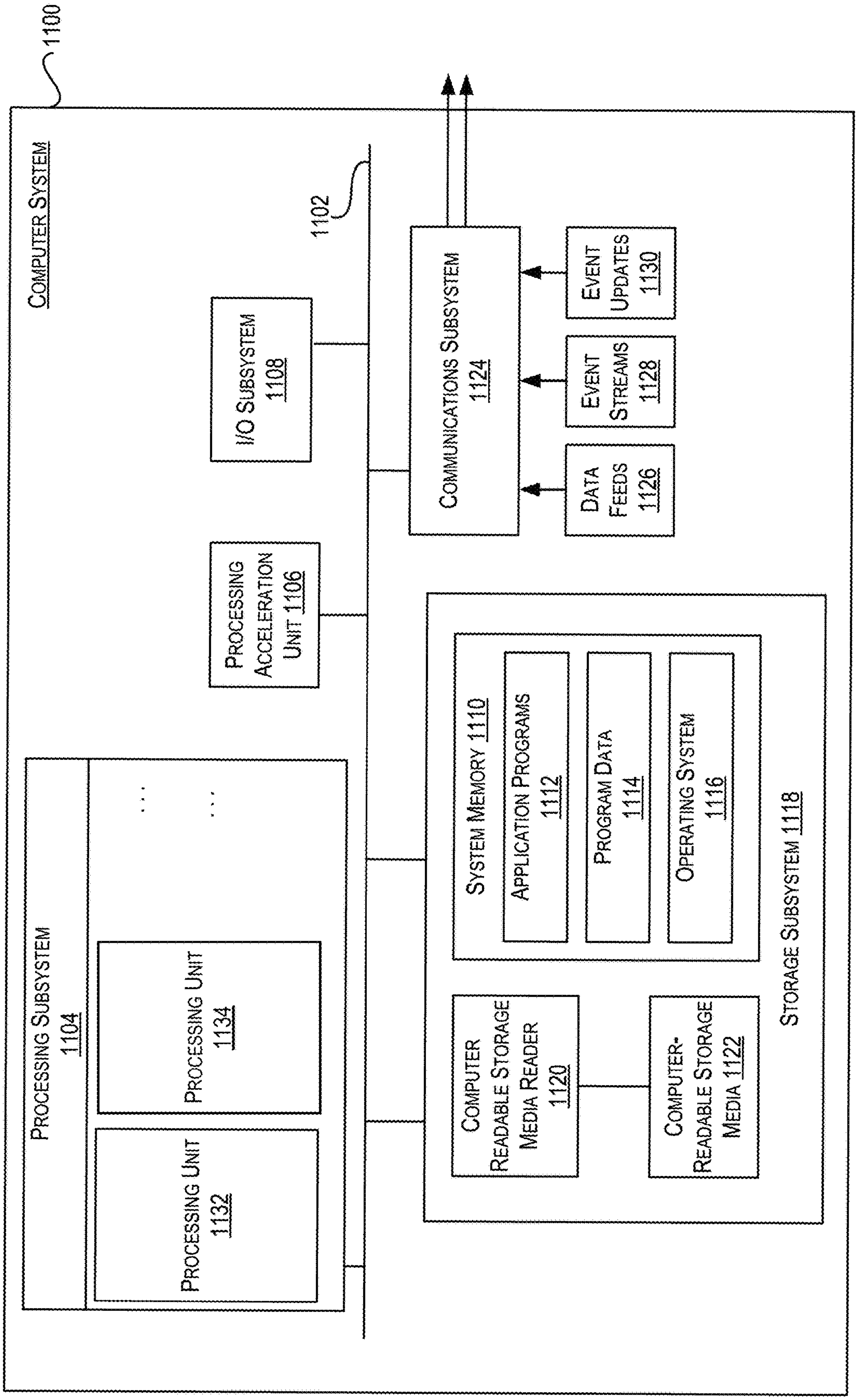
FIG. 11 illustrates an example computer system that may be used to implement certain aspects.

FIG. 11 illustrates an exemplary computer system 1100 that may be used to implement certain aspects. For example, in some aspects, computer system 1100 may be used to implement any of the system 100 for enriching log records with fields from other log records in structured format as shown in FIG. 1 and various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may include be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some aspects, processing subsystem 1104 can include one or more special purpose co-processors such as graphics processors, digital signal processors (DSPs), or the like. In some aspects, some or all of the processing units of processing subsystem 1104 can be implemented using customized circuits, such as application specific integrated circuits (ASICs), or field programmable gate arrays (FPGAs).

In some aspects, the processing units in processing subsystem 1104 can execute instructions stored in system memory 1110 or on computer readable storage media 1122. In various aspects, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain aspects, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some aspects. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1122 may store programming and data constructs that provide the functionality of some aspects. Computer-readable media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, digital video disc (DVD), a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1118 may also include a computer-readable storage media reader 1120 that can further be connected to computer-readable storage media 1122. Reader 1120 may receive and be configured to read data from a memory device such as a disk, a flash drive, etc.

In certain aspects, computer system 1100 may support virtualization technologies, including but not limited to virtualization of processing and memory resources. For example, computer system 1100 may provide support for executing one or more virtual machines. In certain aspects, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, the communication subsystem may be used to transmit a response to a user regarding the inquiry for a Chabot.

Communication subsystem 1124 may support both wired and/or wireless communication protocols. For example, in certain aspects, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1124 can provide wired network connectivity (e.g., Ethernet) in addition to or instead of a wireless interface.

Communication subsystem 1124 can receive and transmit data in various forms. For example, in some aspects, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

storing a corpus of code comprising a plurality of lines of code extracted from one or more data structures of a code project;

storing a plurality of text patterns that are predetermined to be irrelevant to a further code analysis when occurring in code projects;

within the corpus of code, detecting and removing occurrences of text patterns of the plurality of text patterns to generate a modified corpus of code that omits the occurrences of the text patterns of the plurality of text patterns;

for each section of a plurality of sections of code in the modified corpus of code, determining an information unpredictability score of the section, wherein the information unpredictability score is based on an unpredictability of text in the section;

wherein a first section of the plurality of sections of code has a first information unpredictability score and a second section of the plurality of sections of code has a second information unpredictability score that indicates the second section is more unpredictable than the first section;

determining, based on the first information unpredictability score and the second information unpredictability score, that the first section is predictable and the second section is unpredictable;

based at least in part on determining that the second section is unpredictable, storing an indication that a second particular section of the corpus of code that corresponds to the second section of the modified corpus of code has a priority for the further code analysis, wherein a first particular section of the corpus of code that corresponds to the first section of the modified corpus of code does not have a priority for the further code analysis;

causing display of a recommendation to analyze the second section of the modified corpus of code based on the stored indication; and determining presence of sensitive information in the second section to trigger a corrective action that disables execution of code associated with the second section of the modified corpus of code.

2. The computer-implemented method of claim 1, wherein the plurality of text patterns comprise programming language constructs that are natively syntactically understood according to a programming language used by one or more of the code projects.

3. The computer-implemented method of claim 1, wherein the plurality of text patterns comprise logical constructs that are used in code projects but not natively syntactically understood according to a programming language used by one or more of the code projects.

4. The computer-implemented method of claim 1, wherein the plurality of text patterns comprise text values that are used in code projects but not natively syntactically understood according to a programming language used by one or more of the code projects and not defined as a logical construct in one or more of the code projects.

5. The computer-implemented method of claim 1, further comprising determining a particular natural language that occurs in the code project and selecting the plurality of text patterns specific to the particular natural language, wherein a plurality of other text patterns are stored that are specific to a different particular natural language, and wherein the plurality of text patterns are different than the plurality of other text patterns.

6. The computer-implemented method of claim 1, further comprising determining a frequency of occurrence of at least one section among the plurality of sections, and, based at least in part on determining that the at least one section frequently occurs among the plurality of sections, removing the at least one section from a candidate set of sections for the priority for further code analysis.

7. The computer-implemented method of claim 1, wherein the information unpredictability score is a Shannon entropy determined for a given section as, for each species encountered in the given section, an aggregate of a product of a probability of a portion of the given section described by the species and a log of an inverse of the probability of the portion of the section described by the species.

8. The computer-implemented method of claim 1, wherein the information unpredictability score is a password strength, wherein text of a given section is treated as a password input to determine the password strength.

9. A computer-program product comprising one or more non-transitory machine-readable storage media, including stored instructions configured to cause a computing system to perform a set of actions including:

- storing a corpus of code comprising a plurality of lines of code extracted from one or more data structures of a code project;
  - storing a plurality of text patterns that are predetermined to be irrelevant to a further code analysis when occurring in code projects;
  - within the corpus of code, detecting and removing occurrences of text patterns of the plurality of text patterns to generate a modified corpus of code that omits the occurrences of the text patterns of the plurality of text patterns;
  - for each section of a plurality of sections of code in the modified corpus of code, determining an information unpredictability score of the section, wherein the information unpredictability score is based on an unpredictability of text in the section;
  - wherein a first section of the plurality of sections of code has a first information unpredictability score and a second section of the plurality of sections of code has a second information unpredictability score that indicates the second section is more unpredictable than the first section;
  - determining, based on the first information unpredictability score and the second information unpredictability score, that the first section is predictable and the second section is unpredictable;
  - based at least in part on determining that the second section is unpredictable, storing an indication that a second particular section of the corpus of code that corresponds to the second section of the modified corpus of code has a priority for the further code analysis, wherein a first particular section of the corpus of code that corresponds to the first section of the modified corpus of code does not have a priority for the further code analysis;
  - causing display of a recommendation to analyze the second section of the modified corpus of code based on the stored indication; and
  - determining presence of sensitive information in the second section to trigger a corrective action that disables execution of code associated with the second section of the modified corpus of code.

10. The computer-program product of claim 9, wherein the plurality of text patterns comprise programming language constructs that are natively syntactically understood according to a programming language used by one or more of the code projects.

11. The computer-program product of claim 9, wherein the plurality of text patterns comprise logical constructs that are used in code projects but not natively syntactically understood according to a programming language used by one or more of the code projects.

12. The computer-program product of claim 9, wherein the plurality of text patterns comprise text values that are used in code projects but not natively syntactically understood according to a programming language used by one or more of the code projects and not defined as a logical construct in one or more of the code projects.

13. The computer-program product of claim 9, wherein the set of actions further includes:

- determining a particular natural language that occurs in the code project and selecting the plurality of text patterns specific to the particular natural language, wherein a plurality of other text patterns are stored that are specific to a different particular natural language, and wherein the plurality of text patterns are different than the plurality of other text patterns.

14. The computer-program product of claim 9, wherein the set of actions further includes:

- determining a frequency of occurrence of at least one section among the plurality of sections, and, based at least in part on determining that the at least one section frequently occurs among the plurality of sections, removing the at least one section from a candidate set of sections for the priority for further code analysis.

15. The computer-program product of claim 9, wherein the information unpredictability score is a Shannon entropy determined for a given section as, for each species encountered in the given section, an aggregate of a product of a probability of a portion of the given section described by the species and a log of an inverse of the probability of the portion of the section described by the species.

16. A system comprising:

- one or more processors;
- one or more non-transitory computer-readable media storing instructions, which, when executed by the system, cause the system to perform a set of actions including:
  - storing a corpus of code comprising a plurality of lines of code extracted from one or more data structures of a code project;
  - storing a plurality of text patterns that are predetermined to be irrelevant to a further code analysis when occurring in code projects;
  - within the corpus of code, detecting and removing occurrences of text patterns of the plurality of text patterns to generate a modified corpus of code that omits the occurrences of the text patterns of the plurality of text patterns;
  - for each section of a plurality of sections of code in the modified corpus of code, determining an information unpredictability score of the section, wherein the information unpredictability score is based on an unpredictability of text in the section;

wherein a first section of the plurality of sections of code has a first information unpredictability score and a second section of the plurality of sections of code has a second information unpredictability score that indicates the second section is more unpredictable than the first section;

determining, based on the first information unpredictability score and the second information unpredictability score, that the first section is predictable and the second section is unpredictable;

based at least in part on determining that the second section is unpredictable, storing an indication that a second particular section of the corpus of code that corresponds to the second section of the modified corpus of code has a priority for the further code analysis, wherein a first particular section of the corpus of code that corresponds to the first section of the modified corpus of code does not have a priority for the further code analysis;

causing display of a recommendation to analyze the second section of the modified corpus of code based on the stored indication; and determining presence of sensitive information in the second section to trigger a corrective action that disables execution of code associated with the second section of the modified corpus of code.

17. The system of claim 16, wherein the plurality of text patterns comprise programming language constructs that are natively syntactically understood according to a programming language used by one or more of the code projects.

18. The system of claim 16, wherein the set of actions further includes:

determining a particular natural language that occurs in the code project and selecting the plurality of text patterns specific to the particular natural language, wherein a plurality of other text patterns are stored that are specific to a different particular natural language, and wherein the plurality of text patterns are different than the plurality of other text patterns.

19. The system of claim 16, wherein the set of actions further includes:

determining a frequency of occurrence of at least one section among the plurality of sections, and, based at least in part on determining that the at least one section frequently occurs among the plurality of sections, removing the at least one section from a candidate set of sections for the priority for further code analysis.

20. The system of claim 16, wherein the information unpredictability score is a Shannon entropy determined for a given section as, for each species encountered in the given section, an aggregate of a product of a probability of a portion of the given section described by the species and a log of an inverse of the probability of the portion of the section described by the species.

* * * * *